United States Patent
Zhang et al.

(10) Patent No.: US 11,036,108 B2
(45) Date of Patent: Jun. 15, 2021

(54) ARRAY SUBSTRATE AND METHOD OF MANUFACTURING THE SAME, DISPLAY PANEL AND DISPLAY APPARATUS

(71) Applicants: HEFEI BOE DISPLAY TECHNOLOGY CO., LTD., Anhui (CN); BOE TECHNOLOGY GROUP CO., LTD., Beijing (CN)

(72) Inventors: Yuntian Zhang, Beijing (CN); Peng Jiang, Beijing (CN); Ke Dai, Beijing (CN); Jingang Liu, Beijing (CN); Lihui Han, Beijing (CN); Zhonghou Wu, Beijing (CN); Chunxu Zhang, Beijing (CN); Mengmeng Li, Beijing (CN)

(73) Assignees: HEFEI BOE DISPLAY TECHNOLOGY CO., LTD., Hefei (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/832,155

(22) Filed: Mar. 27, 2020

(65) Prior Publication Data
US 2021/0063831 A1 Mar. 4, 2021

(30) Foreign Application Priority Data
Aug. 27, 2019 (CN) .......................... 201910798360.3

(51) Int. Cl.
*G02F 1/1362* (2006.01)
*G09G 3/34* (2006.01)
(Continued)

(52) U.S. Cl.
CPC ...... *G02F 1/136286* (2013.01); *G02F 1/1368* (2013.01); *G02F 1/133345* (2013.01);
(Continued)

(58) Field of Classification Search
CPC ................................................. G02F 1/136286
See application file for complete search history.

(56) References Cited

U.S. PATENT DOCUMENTS

2010/0001932 A1* 1/2010 Kishi .................. G09G 3/3225
345/77
2013/0037815 A1* 2/2013 Okajima ........... H01L 27/14678
257/59
(Continued)

*Primary Examiner* — Sang V Nguyen
(74) *Attorney, Agent, or Firm* — McDermott Will and Emery LLP

(57) ABSTRACT

An array substrate includes a substrate, at least one first light-shielding layer disposed above the substrate, semiconductor retention layers disposed on a side of the at least one first light-shielding layer facing away from the substrate, and data lines disposed on a side of the plurality of semiconductor retention layers facing away from the at least one first light-shielding layer. One first light-shielding layer of the at least one first light-shielding layer is disposed between one semiconductor retention layer of the semiconductor retention layers and the substrate, and an orthographic projection of the first light-shielding layer on the substrate covers an orthographic projection of the semiconductor retention layer on the substrate. The data lines are in one-to-one correspondence with the semiconductor retention layers, and an orthographic projection of each data line on the substrate overlaps with an orthographic projection of a corresponding semiconductor retention layer on the substrate.

16 Claims, 17 Drawing Sheets

(51) Int. Cl.
*G02F 1/1333* (2006.01)
*G02F 1/13357* (2006.01)
*G02F 1/1368* (2006.01)
*G02F 1/1335* (2006.01)

(52) U.S. Cl.
CPC .. *G02F 1/133603* (2013.01); *G02F 1/136209* (2013.01); *G09G 3/3426* (2013.01); *G02F 1/133612* (2021.01)

(56) References Cited

U.S. PATENT DOCUMENTS

| | | | |
|---|---|---|---|
| 2017/0322462 A1* | 11/2017 | Lee | G02F 1/13394 |
| 2018/0204528 A1* | 7/2018 | Miyazawa | G09G 3/20 |
| 2019/0265541 A1* | 8/2019 | Nakamura | G02F 1/1345 |
| 2020/0225534 A1* | 7/2020 | Xu | G02F 1/133788 |
| 2020/0355970 A1* | 11/2020 | Cheng | G02F 1/1362 |

\* cited by examiner

C-C'

E-E'

ARRAY SUBSTRATE AND METHOD OF MANUFACTURING THE SAME, DISPLAY PANEL AND DISPLAY APPARATUS

CROSS-REFERENCE TO RELATED APPLICATION

This application claims priority to Chinese Patent Application No. 201910798360.3, filed with the Chinese Patent Office on Aug. 27, 2019, which is incorporated herein by reference in its entirety.

TECHNICAL FIELD

The present disclosure relates to the field of display technologies, and in particular, to an array substrate and a method of manufacturing the same, a display panel and a display apparatus.

BACKGROUND

A liquid crystal display (LCD) apparatus has been widely used due to its advantages such as high definition and low power consumption, and has become mainstream in current display apparatuses.

A thin film transistor-liquid crystal display (TFT-LCD) apparatus is a common LCD apparatus at present. In the TFT-LCD apparatus, each sub-pixel displays a corresponding color under a driving of a corresponding TFT, therefore, the TFT-LCD apparatus has advantages of high responsiveness, high brightness, and high contrast.

SUMMARY

In a first aspect, some embodiments of the present disclosure provide an array substrate. The array substrate includes a substrate; at least one first light-shielding layer disposed above the substrate; a plurality of semiconductor retention layers disposed on a side of the at least one first light-shielding layer facing away from the substrate; and a plurality of data lines disposed on a side of the plurality of semiconductor retention layers facing away from the at least one first light-shielding layer. One first light-shielding layer of the at least one first light-shielding layer is disposed between one semiconductor retention layer of the plurality of semiconductor retention layers and the substrate, and an orthographic projection of the first light-shielding layer on the substrate covers an orthographic projection of the semiconductor retention layer on the substrate. The plurality of data lines are in one-to-one correspondence with the plurality of semiconductor retention layers, and an orthographic projection of each data line on the substrate overlaps with an orthographic projection of a corresponding semiconductor retention layer on the substrate.

In some embodiments, the at least one first light-shielding layer includes a plurality of first light-shielding layers. The plurality of first light-shielding layers are in one-to-one correspondence with the plurality of semiconductor retention layers, each first light-shielding layer is disposed between a corresponding semiconductor retention layer and the substrate, and an orthographic projection of each first light-shielding layer on the substrate covers an orthographic projection of the corresponding semiconductor retention layer on the substrate.

In some embodiments, the array substrate further includes a plurality of transistors disposed above the substrate. Each transistor includes a gate, an active layer on a side of the gate facing away from the substrate, and a first electrode and a second electrode that are on a side of the active layer facing away from the substrate. The active layer of each transistor includes an active portion corresponding to a region between the first electrode and the second electrode of a same transistor; the plurality of data lines. First electrodes and second electrodes of the plurality of transistors are in a same layer. The plurality of semiconductor retention layers and active layers of the plurality of transistors are in a same layer.

In some embodiments, the array substrate further includes at least one second light-shielding layer disposed between the active layers of the plurality of transistors and the substrate. One second light-shielding layer of the at least one second light-shielding layer is disposed between an active layer of one transistor of the plurality of transistors and the substrate, and an orthographic projection of the second light-shielding layer on the substrate covers an orthographic projection of an active portion of the active layer of the transistor on the substrate.

In some embodiments, the at least one second light-shielding layer includes a plurality of second light-shielding layers. The plurality of second light-shielding layers are in one-to-one correspondence with the plurality of transistors, each second light-shielding layer is disposed between an active layer of a corresponding transistor and the substrate, and an orthographic projection of each second light-shielding layer on the substrate covers an orthographic projection of an active portion of the active layer of the corresponding transistor on the substrate.

In some embodiments, the at least one second light-shielding layer includes a plurality of second light-shielding layers. The plurality of transistors are arranged in an array, each second light-shielding layer is disposed between active layers of a row of transistors and the substrate, and an orthographic projection of each second light-shielding layer on the substrate covers orthographic projections of active portions of active layers of the row of transistors on the substrate.

In some embodiments, the array substrate further includes a plurality of gate lines disposed above the substrate. Gates of each row of transistors are electrically connected to one gate line of the plurality of gate lines; and the orthographic projection of each second light-shielding layer on the substrate further covers orthographic projections of gates of the row of transistors on the substrate, and an orthographic projection of a gate line electrically connected to the gates of the row of transistors on the substrate.

In some embodiments, an arrangement manner of the plurality of gate lines includes at least one of the following: the plurality of gate lines and gates of the plurality of transistors being in a same layer; the plurality of gate lines and gates of the plurality of transistors being made of a same material; or the gates of each row of transistors being a portion of a gate line corresponding to the row of transistors.

In some embodiments, the array substrate further includes a gate insulating layer disposed between the gates of the plurality of transistors and the active layers of the plurality of transistors. The at least one second light-shielding layer is disposed on a side of the active layers of the plurality of transistors facing the gate insulating layer.

In some embodiments, the at least one first light-shielding layer is made of a black insulating material.

In some embodiments, arrangement manners of the at least one first light-shielding layer and the at least one second light-shielding layer include at least one of the following: the at least one first light-shielding layer and the at least one second light-shielding layer being in a same layer; or the at least one first light-shielding layer and the at least one second light-shielding layer being made of a same material.

In some embodiments, an arrangement manner of the plurality of transistors includes at least one of the following: the first electrodes and the second electrodes of the plurality of transistors, and the plurality of data lines being made of a same material; or the active layers of the plurality of transistors and the plurality of semiconductor retention layers being made of a same material.

In some embodiments, the first electrode of each transistor is electrically connected to a data line. The array substrate further includes a passivation layer disposed on a side of the plurality of transistors facing away from the substrate, and a plurality of pixel electrodes disposed on the passivation layer. The passivation layer includes a plurality of through holes therein, and each pixel electrode is electrically connected to a second electrode of a transistor through one through hole of the plurality of through holes.

In a second aspect, some embodiments of the present disclosure provide a display panel. The display panel includes the above array substrate an opposing substrate disposed opposite to the array substrate, and a liquid crystal layer disposed between the array substrate and the opposing substrate.

In a third aspect, some embodiments of the present disclosure provide a display apparatus. The display apparatus includes the above display panel, and a backlight assembly configured to provide light to the display panel. The backlight assembly includes a light source and a pulse width modulation driving circuit electrically connected to the light source, and the pulse width modulation driving circuit is configured to regulate light emitted from the light source.

In some embodiments, the light source includes a plurality of light-emitting diodes.

In a fourth aspect, some embodiments of the present disclosure provide a method of manufacturing an array substrate. The method of manufacturing an array substrate includes forming a plurality of gates and a plurality of gate lines above a substrate; forming a gate insulating layer on a side of the substrate on which the plurality of gates and the plurality of gate lines are formed; forming a plurality of active layers, a plurality of semiconductor retention layers, a plurality of first electrodes and a plurality of second electrodes that are disposed on a side of the plurality of active layers facing away from the substrate, and a plurality of data lines disposed on a side of the plurality of semiconductor retention layers facing away from the substrate on a side of the substrate on which the gate insulating layer is formed, by one patterning process. The plurality of data lines are in one-to-one correspondence with the plurality of semiconductor retention layers, and an orthographic projection of each data line on the substrate overlaps with an orthographic projection of a corresponding semiconductor retention layer on the substrate. Before forming the plurality of semiconductor retention layers, the method of manufacturing the array substrate further includes forming at least one first light-shielding layer above the substrate. One first light-shielding layer of the at least one first light-shielding layer is formed between one semiconductor retention layer of the plurality of semiconductor retention layers to be formed and the substrate, and an orthographic projection of the first light-shielding layer on the substrate covers an orthographic projection of the semiconductor retention layer on the substrate.

In some embodiments, the plurality of gates, the plurality of active layers, the plurality of first electrodes, and the plurality of second electrodes constitute a plurality of transistors together. Each active layer includes an active portion corresponding to a region between a first electrode and a second electrode of a same transistor. Before forming the plurality of active layers, the method of manufacturing the array substrate further includes forming at least one second light-shielding layer above the substrate. One second light-shielding layer of the at least one second light-shielding layer is formed between one active layer of the plurality of active layers to be formed and the substrate, and an orthographic projection of the second light-shielding layer on the substrate covers an orthographic projection of an active portion of the active layer on the substrate.

In some embodiments, forming the at least one first light-shielding layer and the at least one second light-shielding layer in a same layer, and the plurality of gates and the plurality of gate lines in a same layer, by one patterning process.

In some embodiments, forming the at least one first light-shielding layer and the at least one second light-shielding layer in a same layer, the plurality of active layers and the plurality of semiconductor retention layers in a same layer, and the plurality of first electrodes, the plurality of second electrodes, and the plurality of data lines in a same layer are formed, by one patterning process.

BRIEF DESCRIPTION OF THE DRAWINGS

In order to describe technical solutions in some embodiments of the present disclosure more clearly, the accompanying drawings to be used in describing some embodiments of the present disclosure will be introduced briefly. Obviously, the accompanying drawings to be described below are merely some embodiments of the present disclosure, and a person of ordinary skill in the art can obtain other drawings according to those drawings.

DETAILED DESCRIPTION

Technical solutions in some embodiments of the present disclosure will be described clearly and completely with reference to accompanying drawings. Obviously, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, the term "comprise/include" in the description and the claims is construed as open and inclusive, that is "including, but not limited to".

In the description and the claims, each term may have nuanced meanings implied in the context in addition to its clearly stated meanings. Moreover, phrase "in one embodiment" or "in some embodiments" does not necessarily refer to same embodiment(s), and phrase "in another embodiment" or "in some other embodiments" does not necessarily refer to different embodiment(s). Similarly, phrase "in one example" or "in some examples" does not necessarily refer to same example(s), and phrase "in another example" or "in some other examples" does not necessarily refer to different example(s). For example, a subject that is requested to be protected is intended to include, in whole or in part, exemplary embodiments or a combination of examples.

As followings, terms "first" and "second" are used for descriptive purposes only and are not to be construed as indicating or implying the relative importance or implicitly indicating the number of indicated technical features. Thus, features defined as "first", "second" may explicitly or implicitly include one or more of the features. In the description of embodiments of the present disclosure, phrase "a plurality of" means two or more, unless otherwise specified.

In the description of some embodiments, expressions "coupled" and "connected" and their extensions may be used. For example, term "connected" may be used in the description of some embodiments to indicate that two or more components are in direct physical or electrical contact with each other. For another example, term "coupled" may be used in the description of some embodiments to indicate that two or more components are in direct physical or electrical contact.

Moreover, phrase "at least one of A, B, or C" has a same meaning as "at least one of A, B, and C", and both include the following combinations of A, B, and C: only A, only B, only C, a combination of A and B, a combination of A and C, a combination of B and C, and a combination of A and B and C.

Figure 1A:
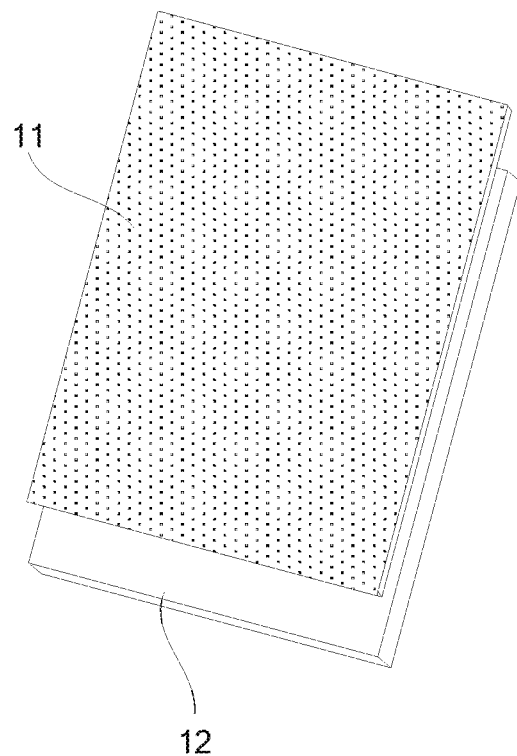
FIG. 1A is a schematic diagram showing a structure of a display apparatus, according to some embodiments of the present disclosure.

As shown in FIG. 1A, some embodiments of the present disclosure provide a display apparatus 1. The display apparatus 1 includes a display panel 11 and a backlight assembly 12 configured to provide light to the display panel 11. For example, the display apparatus is a mobile phone, a tablet computer, a television, a display, a notebook computer, a digital photo frame, a navigator, or any other product or component having a display function.

Figure 1B:
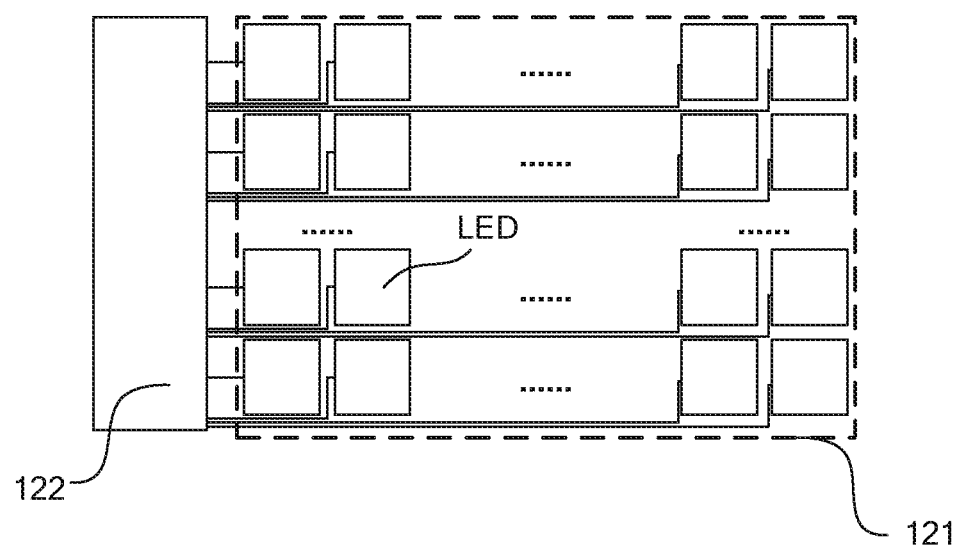
FIG. 1B is a schematic diagram showing a structure of a backlight assembly in a display apparatus, according to some embodiments of the present disclosure.

As shown in FIG. 1B, the backlight assembly 12 includes a light source 121 and a pulse width modulation (PWM) driving circuit 122 electrically connected to the light source 121. The PWM driving circuit 122 is configured to regulate light emitted from the light source 121.

The light source 121 includes a plurality of light-emitting diodes (LEDs). For example, each LED is a Mini-LED or a Micro-LED. For convenience of description, the light source 121 is hereinafter referred to as an LED light source 121.

In some examples, as shown in FIG. 1B, the plurality of LEDs are block-shaped LEDs spaced apart from each other and arranged in an array. In other examples, the plurality of LEDs are strip-shaped LEDs spaced apart from each other and arranged along a row direction or a column direction.

A specific structure of the LED light source 121 is not limited in embodiments of the present disclosure, as long as the LED light source 121 may emit light under driving of a corresponding electric signal from the PWM driving circuit 122.

The PWM driving circuit is configured to regulate light emitted from the LED light source 121. According to different lighting requirements of the backlight assembly 12, there are different connection manners between the PWM driving circuit 122 and the plurality of LEDs in the LED light source 121.

For example, as shown in FIG. 1B, each LED is electrically connected to the PWM driving circuit 122 independently. So that each LED may be controlled by the PWM driving circuit 122 independently, thereby achieving dynamic dimming of each LED.

For another example, the plurality of LEDs are divided into different groups, and each group of LEDs is electrically connected to the PWM driving circuit 122. So that each group of LEDs may be controlled by the PWM driving circuit 122 independently, thereby achieving local dimming of LED light source 121.

A signal output by the PWM driving circuit 122 is a PWM signal. Under control of the PWM signal, the light emitted from the LED light source 121 may be switched between a bright state and a dark state, that is, the LED light source 121 is capable of outputting light in a light-dark jump cycle. In this way, the backlight assembly 12 is capable of providing light of variable brightness to the display panel 11, so as to meet different display requirements of the display panel 11.

The LED light source 121 outputs light in the light-dark jump cycle. In this way, in some application scenarios, different regions of the display panel 11 have different brightness; and in other application scenarios, energy consumption of the backlight assembly 12 may be reduced.

In some examples, the PWM driving circuit 122 includes transistors, signal lines, a timing controller, a driving chip and other components. A specific structure of the PWM driving circuit 122 is not limited in embodiments of the present disclosure, as long as the PWM driving circuit 122 is capable of regulating the light emitted from the LED light source 121 through the output PWM signal.

In some examples, the backlight assembly 12 further includes the following structures: a heat sink that dissipates heat for components such as the LED light source 121 and the PWM driving circuit 122, and a back plate that accommodates components such as the LED light source 121, the PWM driving circuit 122, and the heat sink.

It will be understood that, the description of each component in the backlight assembly 12 is merely an example. According to different lighting requirements of the backlight assembly 12, the backlight assembly 12 may further include other component(s) having corresponding function(s), which will not be described herein again.

For example, the display panel 11 is a liquid crystal display (LCD) panel. For convenience of description, the display panel 11 is hereinafter referred to as an LCD panel 11.

Figure 1C:
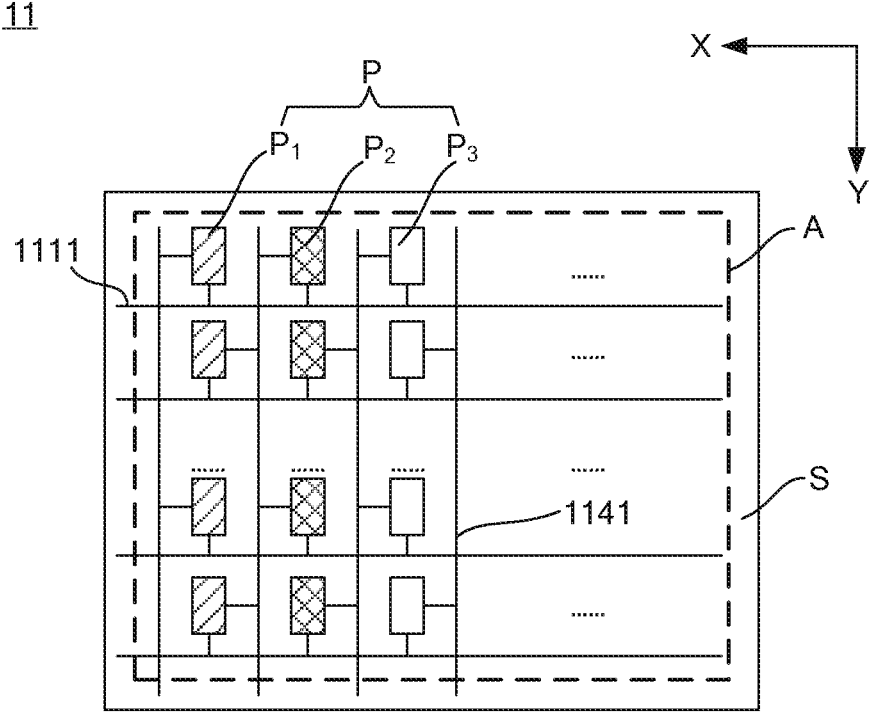
FIG. 1C is a schematic top view showing a structure of a display panel, according to some embodiments of the present disclosure.

As shown in FIG. 1C, the LCD panel 11 has a display area A and a peripheral area S. According to different designs of the LCD panel 11, specific position of the peripheral area S may be adjusted accordingly. As shown in FIG. 1C, the peripheral area S surrounds the display area A. Or, the peripheral area S is on one or more sides of the display area A, but does not surround the display area A.

The LCD panel 11 includes a plurality of sub-pixels P of colors in the display area A. The plurality of sub-pixels P of colors include a plurality of sub-pixels P1 of a first color, a plurality of sub-pixels P2 of a second color, and a plurality of sub-pixels P3 of a third color. The first color, the second color and the third color are three primary colors (e.g., red, green and blue).

For convenience of description, the embodiments of the present disclosure are described by taking an example in which the plurality of sub-pixels P are arranged in an array. In this case, as shown in FIG. 1C, sub-pixels P arranged in a line in a row direction (e.g., an X direction) are referred to as a same row of sub-pixels. Sub-pixels P arranged in a line in a column direction (e.g., a Y direction) are referred to as a same column of sub-pixels.

As shown in FIG. 1C, the LCD panel 11 further includes a plurality of gate lines 1111 spaced apart from each other and a plurality of data lines 1141 spaced apart from each other.

For example, an extension direction of each gate line 1111 is substantially parallel to the X direction. Each gate line 1111 includes a portion in the display area A and a portion extending from the display area A to the peripheral area S. In this way, it is convenient for the gate lines 1111 to be electrically connected to a circuit structure in the peripheral area S of the LCD panel 11, so that the gate lines 1111 may receive corresponding signals.

For example, an extension direction of each data line 1141 is substantially parallel to the Y direction. Each data line 1141 includes a portion in the display area A and a portion extending from the display area A to the peripheral area S. In this way, it is convenient for the data lines 1141 to be connected to a circuit structure in the peripheral area S of the LCD panel 11, so that the data lines 1141 may receive corresponding signals.

In some examples, as shown in FIG. 1C, a same row of sub-pixels P is electrically connected to a single gate line 1111.

In some examples, as shown in FIG. 1C, each column of sub-pixels P is disposed between two adjacent data lines 1141. In each column of sub-pixels P, sub-pixels P in odd-numbered rows are electrically connected to one of the two adjacent data lines 1141, and sub-pixels P in even-numbered rows are electrically connected to the other of the two adjacent data lines 1141. Moreover, for any two adjacent columns of sub-pixels P, sub-pixels P in one column in odd-numbered rows and sub-pixels P in the other column in even-numbered rows are electrically connected to a same data line 1141 disposed between the sub-pixels P in the two columns.

Of course, in other examples, a same column of sub-pixels P is electrically connected to a single data line 1141, which is also permissible. That is, different columns of sub-pixels P are electrically connected to different data lines 1141.

Main structures of the LCD panel 11 will be described below. The LCD panel 11 includes an array substrate, an opposing substrate disposed opposite to the array substrate, and a liquid crystal (LC) layer disposed between the array substrate and the opposing substrate.

Figure 2A:
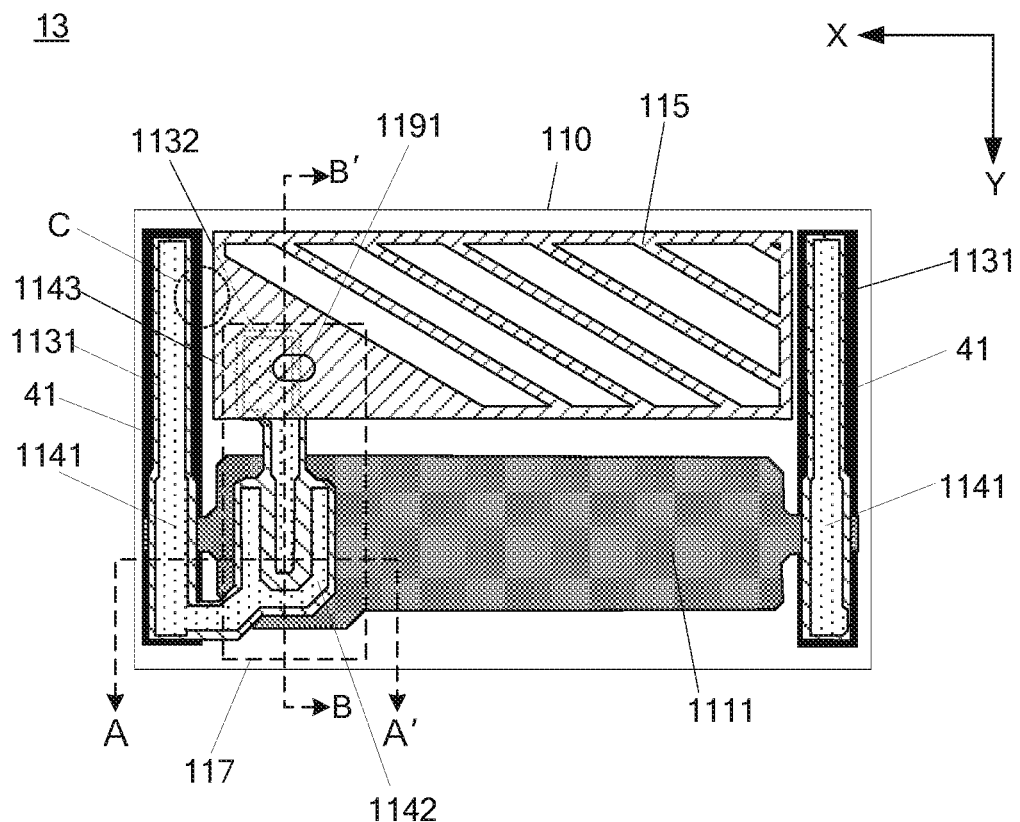
FIG. 2A is a schematic top view showing a structure of an array substrate, according to some embodiments of the present disclosure.
Figure 2B:
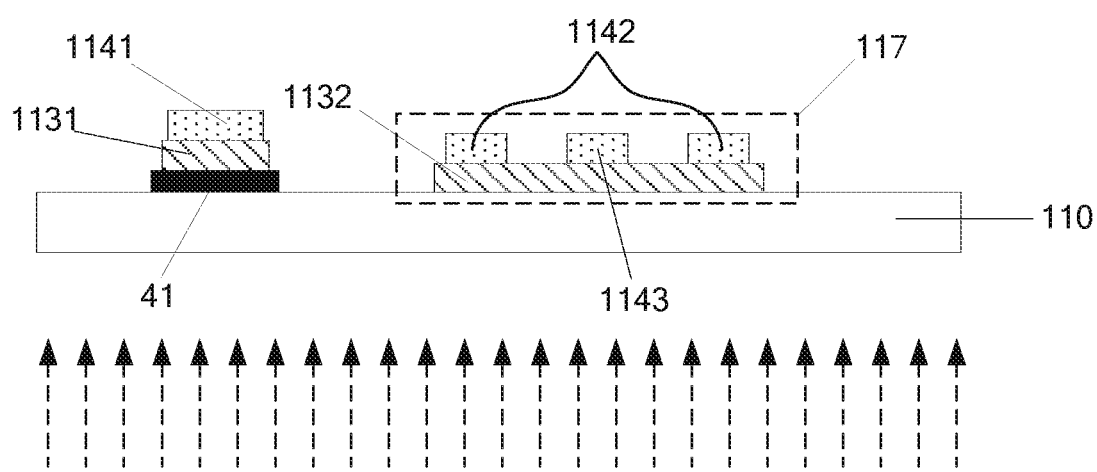
FIG. 2B is a schematic cross-sectional view showing a structure taken along line A-A' in FIG. 2A.
Figure 2C:
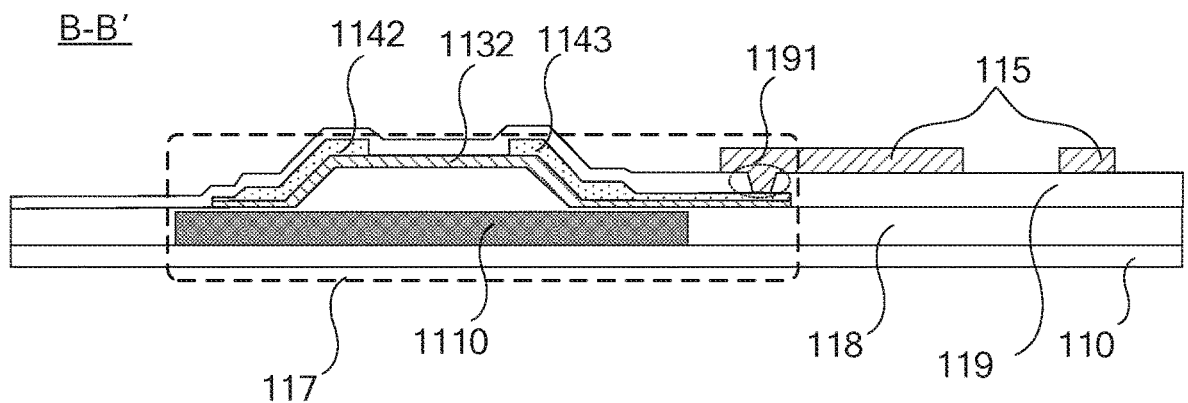
FIG. 2C is a schematic cross-sectional view showing a structure taken along line B-B' in FIG. 2A.

Some embodiments of the present disclosure provide an array substrate, and the array substrate may be applied to the above LCD panel 11. As shown in FIGS. 2A to 2C, the array substrate 13 includes a substrate 110, at least one first light-shielding layer 41 disposed above the substrate 110, a plurality of semiconductor retention layers 1131 disposed on a side of the at least one first light-shielding layer 41 facing away from the substrate 110, and a plurality of data lines 1141 disposed on a side of the plurality of semiconductor retention layers 1131 facing away from the at least one first light-shielding layer 41.

The substrate 110 is made of a light-transmitting material, such as glass or transparent resin.

It will be noted that, since each first light-shielding layer 41 generally has a certain pattern, each first light-shielding layer 41 may also be referred to as a first light-shielding pattern. Similarly, since each semiconductor retention layer 1131 generally has a certain pattern, each semiconductor retention layer 1131 may also be referred to as a semiconductor retention pattern.

In some examples, some structures (e.g., the at least one first light-shielding layer 41) of the above structures are in direct contact with the substrate 110. In other examples, the array substrate 13 further includes other layer(s) (e.g., a buffer layer) disposed between the above structures and the substrate 110.

Each structure disposed above the substrate 110 will be described in detail below.

As shown in FIGS. 2A to 2C, the plurality of semiconductor retention layers 1131 are disposed between the plurality of data lines 1141 and the substrate 110. The plurality of data lines 1141 are in one-to-one correspondence with the plurality of semiconductor retention layers 1131. An orthographic projection of each data line 1141 on the substrate 110 overlaps with an orthographic projection of a corresponding semiconductor retention layer 1131 on the substrate 110. Only two semiconductor retention layers 1131 and two data lines 1141 are illustrated in FIG. 2A It will be understood that, for an overlapping manner between the orthographic projection of a data line 1141 on the substrate 110 and the orthographic projection of a corresponding semiconductor retention layer 1131 on the substrate 110, the overlapping manner is that, for example, the orthographic projection of a data line 1141 on the substrate 110 is within a boundary of the orthographic projection of a corresponding semiconductor retention layer 1131 on the substrate 110, that is, the orthographic projection is not beyond the boundary.

For another example, the overlapping manner is that: along a thickness direction of the substrate 110, the orthographic projection of a data line 1141 on the substrate 110 completely overlaps with the orthographic projection of a corresponding semiconductor retention layer 1131 on the substrate 110.

For yet another example, the overlapping manner is that: a portion of the orthographic projection of a data line 1141 on the substrate 110 is within a boundary of the orthographic projection of a corresponding semiconductor retention layer 1131 on the substrate 110.

Moreover, in some examples, overlapping manners between orthographic projections of the plurality of data lines 1141 on the substrate 110 and orthographic projections of corresponding semiconductor retention layers 1131 on the substrate 110 are all the same, so as to simplify a manufacturing process. For example, as shown in FIGS. 2A and 2B, the orthographic projection of each data line 1141 on the substrate 110 is within the boundary of the orthographic projection of the corresponding semiconductor retention layer 1131 on the substrate 110.

Of course, in other examples, overlapping manners between orthographic projections of different data lines 1141 on the substrate 110 and orthographic projections of the corresponding semiconductor retention layers 1131 on the substrate 110 are different from each other, which is also permissible.

As shown in FIGS. 2A to 2C, the at least one first light-shielding layer 41 is disposed between the plurality of semiconductor retention layers 1131 and the substrate 110. One first light-shielding layer 41 of the at least one first light-shielding layer 41 is disposed between a semiconductor retention layer 1131 and the substrate 110. And an orthographic projection of the first light-shielding layer 41 on the substrate 110 covers an orthographic projection of the semiconductor retention layer 1131 on the substrate 110.

Here, as shown in FIGS. 2A and 2B, an orthographic projection of a semiconductor retention layer 1131 on the substrate 110 is within a boundary of an orthographic projection of a corresponding first light-shielding layer 41 on the substrate 110.

Of course, along the thickness direction of the substrate 110, an orthographic projection of a first light-shielding layer 41 on the substrate 110 completely overlaps with an orthographic projection of a corresponding semiconductor retention layer 1131 on the substrate 110, which is also permissible.

In some embodiments, the at least one first light-shielding layer 41 includes a plurality of first light-shielding layers 41. In this case, overlapping manners between orthographic projections of the plurality of first light-shielding layers 41 on the substrate 110 and orthographic projections of corresponding semiconductor retention layers 1131 on the substrate 110 are all the same, so as to further simplify the manufacturing process.

Of course, in other examples, overlapping manners between orthographic projections of different first light-shielding layers 41 on the substrate 110 and orthographic projections of corresponding semiconductor retention layers 1131 on the substrate 110 are different from each other, which is also permissible.

In some embodiments, as shown in FIGS. 2A to 2D, the array substrate 13 further includes a plurality of transistors 117 disposed above the substrate 110.

Each transistor 117 includes a gate 1110, an active layer 1132 on a side of the gate 1110 facing away from the substrate 110, and a first electrode 1142 and a second electrode 1143 that are on a side of the active layer 1132 facing away from the substrate 110. The active layer 1132 includes an active portion corresponding to a region between a first electrode 1142 and a second electrode 1143 of a same transistor.

It will be understood that, the active portion of the active layer 1132 is a channel region of the transistor 117 in an on-state. Therefore, the active portion with a good stability may make the transistor 117 have stable electrical performance.

Since the gate 1110 of the transistor 117 is disposed on a side of the active layer 1132 facing the substrate 110, and the first electrode 1142 and the second electrode 1143 of the transistor 117 are on a side of the active layer 1132 away from the substrate 110, the transistor 117 is a bottom-gate transistor.

It will be noted that, in some examples, as shown in FIG. 2A, a planar shape of each transistor 117 is U-shaped.

In the U-shaped transistor 117, the first electrode 1142 includes two strip-shaped portions opposite to each other, and a connection portion on a same side of the two strip-shaped portions and connecting the two strip-shaped portions, so that a planar shape of the first electrode 1142 is substantially U-shaped. The second electrode 1143 is strip-shaped, and a portion of the second electrode 1143 extends into a region between the two strip-shaped portions of the first electrode 1142.

Of course, the planar shape of the transistor 117 may also be other shapes. In other examples, the first electrode 1142 and the second electrode 1143 in each transistor 117 are disposed opposite to each other, and shapes of the first electrode 1142 and the second electrode 1143 in each transistor 117 are both block-shaped (or strip-shaped). Specific structures will not be described herein again.

The transistor 117 used in embodiments of the present disclosure may be a thin film transistor or a field effect transistor or other devices having a corresponding switching properties. Since a source and a drain in the transistor 117 are generally symmetrical in structure and composition, there is no difference between the source and the drain. In embodiments of the present disclosure, in order to distinguish two electrodes other than the gate in a same transistor 117, one electrode is referred to as a source and the other is referred to as a drain.

For convenience of description, the first electrode 1142 is referred to as a source 1142 and the second electrode 1143 is referred to as a drain 1143 in the following descriptions.

In some embodiments, as shown in FIG. 2A, the plurality of data lines 1141 and sources 1142 and drains 1143 of the plurality of transistors 117 are in a same layer.

In this case, the plurality of data lines 1141 and the sources 1142 and the drains 1143 of the plurality of transistors 117 are made of a same material. That is to say, the plurality of data lines 1141 and the sources 1142 and the drains 1143 of the plurality of transistors 117 may be formed in one patterning process, so as to further simplify the manufacturing process.

Since the source 1142 of each transistor 117 is electrically connected to a corresponding data line 1141, furthermore, each data line 1141 is directly connected to a plurality of sources 1142 corresponding to the data line 1141 to form an integrated structure.

In some embodiments, as shown in FIG. 2A, the plurality of semiconductor retention layers 1131 and active layers 1132 of the plurality of transistors 117 are in a same layer. In this case, the active layers 1132 of the plurality of transistors 117 and the plurality of semiconductor retention layers 1131 are made of a same material. The material is a semiconductor material including any one of an amorphous silicon (a-Si), a polysilicon (p-Si), an oxide semiconductor (e.g., indium gallium zinc oxide, IGZO), and an organic semiconductor (e.g., pentacene).

That is to say, the active layers 1132 of the plurality of transistors 117 and the plurality of semiconductor retention layers 1131 may be formed in one patterning process.

In some embodiments, as shown in FIG. 2A, the plurality of gate lines 1111 and gates 1110 of the plurality of transistors 117 are in a same layer. In this case, the plurality of gate lines 1111 and the gates 1110 of the plurality of transistors 117 are made of a same material. That is to say, the plurality of gate lines 1111 and the gates 1110 of the plurality of transistors 117 may be formed in one patterning process.

Since the gate 1110 of each transistor 117 is electrically connected to a corresponding gate line 1111, furthermore, gates 1110 of each row of transistors 117 are a portion of a gate line 1111 corresponding to the row of transistors.

It should be understood herein that in the embodiments of the present disclosure, "same layer" refers to a layer structure formed by a film layer for forming a specific pattern by a same film forming process and then by one patterning process using a same mask. Depending on the different specific patterns, the same patterning process may includes several exposure, development or etching processes, and the specific patterns in the formed layer structure may be continuous or discontinuous, and these specific patterns may also be at different heights or have different thicknesses. For example, in some embodiments of the present disclosure, a pattern of a plurality of components/elements may be disposed in the same layer, which may not increase the number of the film layers, reduce a thickness of the display panel, and further simplify the manufacturing process.

Moreover, in embodiments of the present disclosure, the term "patterning process" refers to a process including a photolithography process, or a process including a photolithography process and an etching step. The photolithography process refers to a process including film formation (e.g., chemical vapor deposition, CVD), exposure, and development, and a process of forming a pattern by using a photoresist, a mask, and an exposure machine.

Those skilled in the art should understand that, in a case where the semiconductor retention layers 1131 are disposed on the side of the data lines 1141 facing the substrate 110, the semiconductor retention layers 1131 and the active layer 1132s are in the same layer and are made of the same material, by adjusting the mask used in the patterning process, for example, using a semi-transparent mask, the sources 1142, the drains 1143, the data lines 1141, the active layers 1132, and the semiconductor retention layers 1131 may be all formed in one patterning process, so as to further simplify the manufacturing process.

It will be noted that, in a case where the data lines 1141 and the semiconductor retention layers 1131 are formed by one patterning process, since the semiconductor retention layers 1131 are disposed on the side of the data lines 1141 facing the substrate 110, that is, the data lines 1141 are disposed at an upward side and the semiconductor retention layers 1131 are disposed at a downward side, the data lines 1141 need to be formed by one etching process, and then the semiconductor retention layers 1131 are formed by another etching process.

In this way, in order to prevent the etching solution used in forming the semiconductor retention layers 1131 from affecting the formed data lines 114, the orthographic projection of each data line 1141 on the substrate 110 is within the boundary of the orthographic projection of the corresponding semiconductor retention layer 1131 on the substrate 110. That is to say, along the X direction in FIG. 2A, a width of each data line 1141 is slightly less than a width of the corresponding semiconductor retention layer 1131.

Of course, in a case where the data lines 1141 and the semiconductor retention layers 1131 are formed by one patterning process, along the thickness direction of the substrate 110, the orthographic projection of each data line 1141 on the substrate 110 completely overlaps with the orthographic projection of the corresponding semiconductor retention layer 1131 on the substrate 110, which is also permissible. That is to say, along the X direction in FIG. 2A, the width of each data line 1141 is equal to the width of the corresponding semiconductor retention layer 1131.

Figure 2D:
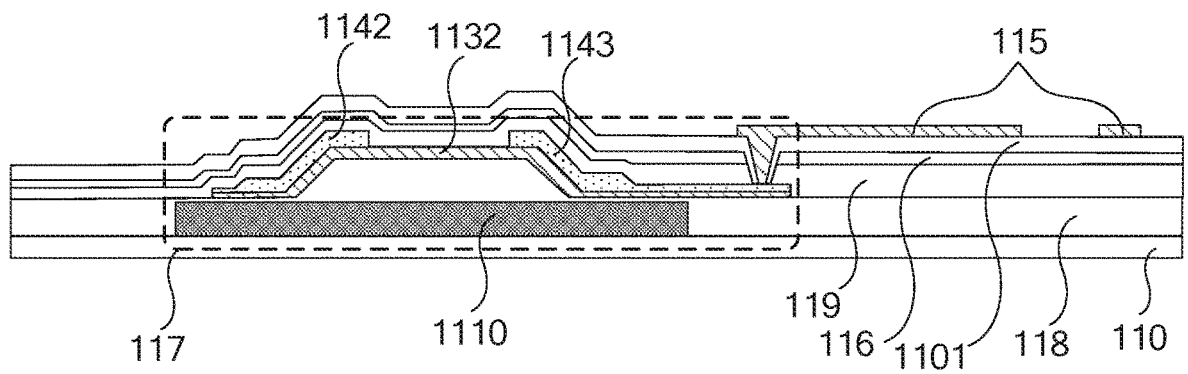
FIG. 2D is another schematic cross-sectional view showing a structure taken along line B-B' in FIG. 2A.

As shown in FIGS. 2C and 2D, in some embodiments of the present disclosure, the array substrate 13 further includes a passivation layer 119 disposed on a side of the plurality of transistors 117 facing away from the substrate 110, and a plurality of pixel electrodes 115 disposed on the passivation layer 119.

The passivation layer 119 is capable of protecting a plurality of structures disposed thereunder. Moreover, since a thickness of the passivation layer 119 is greater than thickness of other insulating layers in the array substrate 13, the plurality of pixel electrodes 115 disposed thereon may be provided with a relatively flat surface, so as to facilitate the manufacture of the pixel electrodes 115.

The passivation layer includes a plurality of through holes 1191 therein, and each pixel electrode 115 is electrically connected to a drain 1143 of a transistor 117 through a through hole 1191.

Each transistor 117 and a pixel electrode 115 electrically connected to the transistor 117 are in a single sub-pixel P.

In some embodiments, the array substrate 13 further includes a plurality of common electrodes 116 disposed above the substrate 110, and the plurality of common electrodes 116 are in one-to-one correspondence with the plurality of pixel electrodes 115. As shown in FIG. 2D, each common electrode 116 and a corresponding pixel electrode 115 are in a single sub-pixel P.

For example, the pixel electrodes 115 and the common electrodes 116 are disposed in different layers. In this case, as shown in FIG. 2D, the array substrate 13 further includes an interlayer insulating layer 1101 disposed between the pixel electrodes 115 and the common electrodes 116.

For another example, the pixel electrodes 115 and the common electrodes 116 are in a same layer. In this case, each pixel electrode 115 and each common electrode 116 are both comb structures including a plurality of strip-shaped sub-electrodes.

In other embodiments, the opposing substrate 14 disposed opposite to the array substrate 13 includes a common electrode layer, that is, the common electrode layer includes a plurality of common electrodes 116 connected to each other.

In order to facilitate understanding the function of the first light-shielding layer 41 provided in these embodiments of the present disclosure, an array substrate without a first light-shielding layer 41 in the related art will be specifically described below first.

Figure 3A:
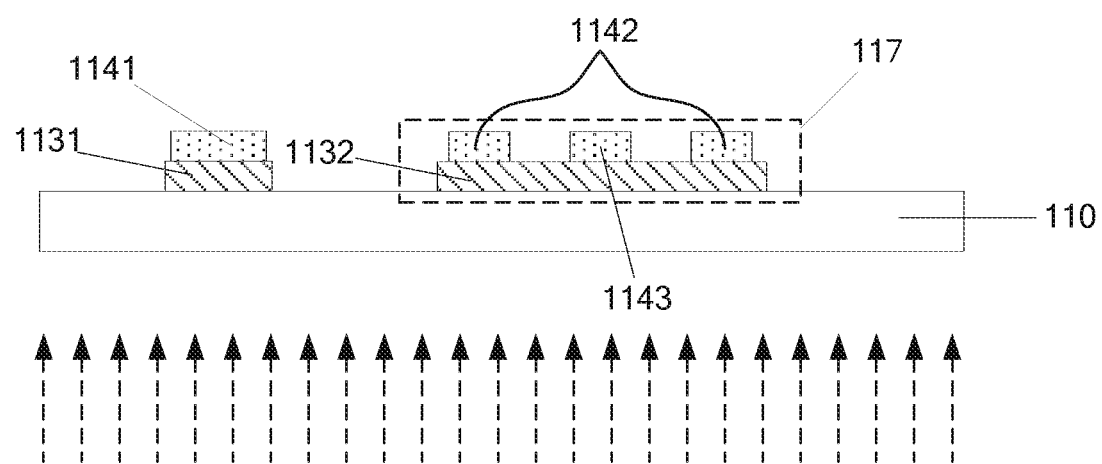
FIG. 3A is a schematic diagram showing a structure of an array substrate in the related art.

FIG. 3A is a schematic diagram showing a structure of an array substrate in the related art, and a cross-sectional direction in FIG. 3A may refer to the A-A' direction in FIG. 2A.

In a case where the array substrate in the related art is applied to a display apparatus, the light from the backlight assembly (shown by dotted arrows in FIG. 3A) will reach a surface of the substrate 110 in the array substrate and then enter the array substrate. Since the semiconductor retention layer 1131 is disposed on a side of the data line 1141 facing the substrate 110, and the semiconductor retention layer 1131 is made of a semiconductor material, the semiconductor material performs different material properties with and without light condition. In a case where there is light, the semiconductor material tends to behave as a metal material, so that the semiconductor retention layer 1131 has a conductive ability; and in a case where there is no light, the semiconductor material tends to behave as an insulating material, so that the semiconductor retention layer 1131 has an insulating ability.

In particular, in a case where the LED light source in the backlight assembly outputs light in the light-dark jump cycle, in the related art, the semiconductor retention layer 1131 below the data line 1141 will correspondingly jump between a conductor and an insulator, which reduces the electrical stability of the array substrate.

Figure 3B:
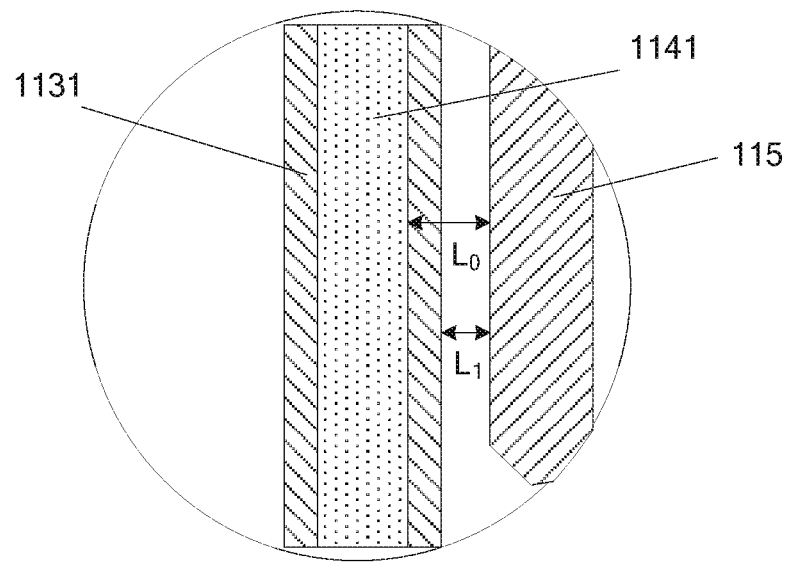
FIG. 3B is a partially enlarged schematic diagram showing an array substrate in the related art.

As shown in FIG. 3B, in the related art, a horizontal distance between a pixel electrode 115 and an adjacent data line 1141 is $L_0$, and a horizontal distance between the pixel electrode 115 and a semiconductor retention layer 1131 below the data line 1141 is $L_1$. Since the orthographic projection of the data line 1141 on the substrate 110 is generally within the boundary of the orthographic projection of a semiconductor retention layer 1131 corresponding to the data line 1141 on the substrate 110, that is, an area of the semiconductor retention layer 1131 is greater than an area of the corresponding data line 1141. Therefore, $L_1$ is less than $L_0$ ($L_1<L_0$).

In this way, since the semiconductor retention layer 1131 is conductive in a case where there is light, a data line 1141 and a semiconductor retention layer 1131 disposed thereunder may be regarded as a whole having conductivity, and a parasitic capacitance is generated between the whole and an adjacent pixel electrode 115. In this case, factors affecting a magnitude of the parasitic capacitance include the distance between the semiconductor retention layer 1131 and the pixel electrode 115, and the distance is equal to $L_1$. In a case where there is no light, since the data line 1141 is conductive and the semiconductor retention layer 1131 is not conductive, a parasitic capacitance may be generated only between the data line 1141 and the adjacent pixel electrode 115. In this case, factors affecting the magnitude of the parasitic capacitance include the distance between the data line 1141 and the pixel electrode 115, and the distance is equal to $L_0$.

Since $L_1$ is less than $L_0$, according to a formula of the capacitance, it will be known that the parasitic capacitance between the data line 1141 and the pixel electrode 115 is increased in a case where there is light relative to a case where there is no light. The increased parasitic capacitance will cause a load of the LCD panel 11 to be increased in the case where there is light relative to the case where there is no light. After the load is increased, there is a signal delay on the data line 1141, then in a process charging a pixel electrode disposed in a corresponding sub-pixel P through a voltage signal transmitted through each data line 1141, decay time of the voltage at the pixel electrode rising to a preset value and decay time of the voltage at the pixel electrode falling down are extended. As a result, charging time of the pixel electrode in the sub-pixel P is reduced, which eventually results in a reduced brightness of the sub-pixel P.

It will be understood that, the factors affecting the magnitude of the parasitic capacitance include not only the distance, but also the area. That is to say, in a case where the semiconductor retention layer 1131 is not conductive, the factors affecting the magnitude of the parasitic capacitance further include an area of the data line 1141. However, in a case where the semiconductor retention layer 1131 is conductive, the factors affecting the magnitude of the parasitic capacitance further include the area of the data line 1141 and the area of the semiconductor retention layer 1131, which also increases the parasitic capacitance. Therefore, even in the case where the orthographic projection of the data line 1141 on the substrate 110 completely overlaps with the orthographic projection of the semiconductor retention layer 1131 corresponding to the data line 1141 on the substrate 110, the parasitic capacitance is also increased in the case where there is light relative to the case where there is no light.

The foregoing descriptions only analyze the parasitic capacitance between the pixel electrode 115 and both of the data line 1141 and the semiconductor retention layer 1131 in the related art. It will be understood that, in a case where the array substrate in the related art further includes a plurality of common electrodes, there is also a parasitic capacitance between both of the data line 1141 and the semiconductor retention layer 1131 and an adjacent common electrode 116. Factors affecting the magnitude of the parasitic capacitance include not only the distance (i.e., a distance between the data line 1141 and the adjacent common electrode 116 and a distance between the semiconductor retention layer 1131 and the adjacent common electrode 116) and the area (i.e., an area of the data line 1141 and an area of the semiconductor retention layer 1131), but also an influence of an insulating layer (e.g., a gate insulating layer 118) in the array substrate. In the case where the semiconductor retention layer 1131 is not conductive, the factors affecting the magnitude of the parasitic capacitance include the distances, the areas, and a dielectric constant of the gate insulating layer 118. In the case where the semiconductor retention layer 1131 is conductive, the factors affecting the magnitude of the parasitic capacitance further include a dielectric constant of the semiconductor retention layer 1131, which also increases the parasitic capacitance.

In conclusion, the semiconductor retention layer 1131 is conductive in the case where there is light, so that the parasitic capacitance in the array substrate in the related art is increased relative to the case where there is no light, thereby affecting a charging time of the pixel electrode in the sub-pixel P.

Figure 3C:
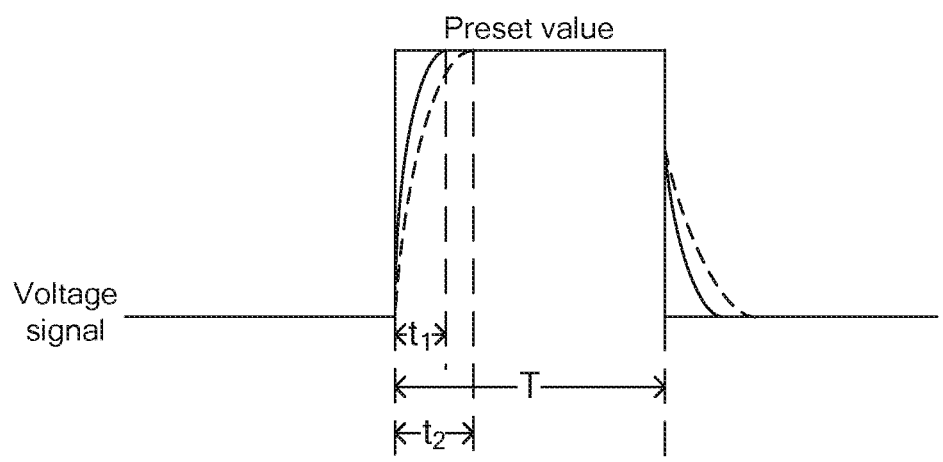
FIG. 3C is a schematic diagram showing decay time of a voltage signal on a pixel electrode in an array substrate in the related art with and without light condition, respectively.

As shown in FIG. 3C, in an ideal state, there is no delay in a process where a voltage signal on the pixel electrode rises to a preset value. In this case, the charging time of the pixel electrode in the sub-pixel P is equal to T.

In an actual state, there is a certain delay in the process where the voltage signal on the pixel electrode rises to the preset value in the cases where there is light or no light. As shown in FIG. 3C, a decay time of the voltage signal in the case where there is no light is equal to $t_1$, and a decay time of the voltage signal in the case where there is light is equal to $t_2$. Since the load of the LCD panel is increased in the case where there is light relative to the case where there is no light, $t_2$ is greater than $t_1$ ($t_2>t_1$). As a result, a charging time of the pixel electrode in the sub-pixel P in the case where there is light is less than a charging time of the pixel electrode in the sub-pixel P in the case where there is no light. The charging time of the pixel electrode in the sub-pixel P is very short, which results in a low display brightness of the sub-pixel P.

Figure 3D:
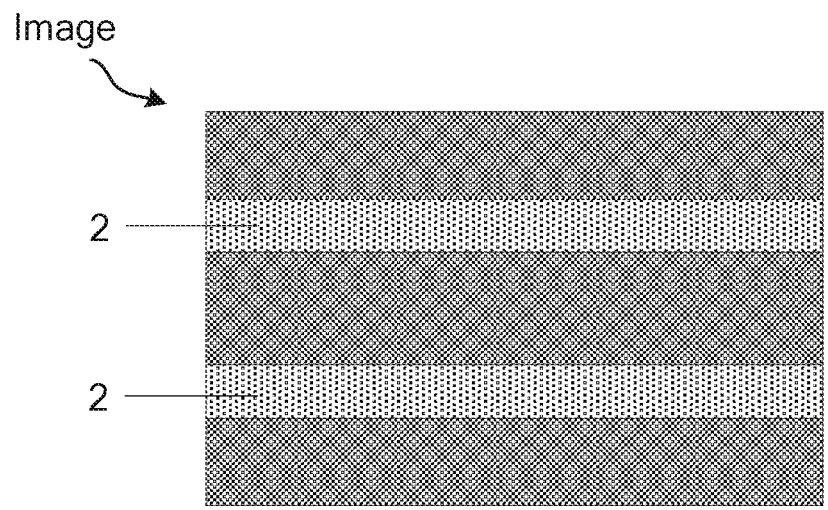
FIG. 3D is a schematic diagram of a display effect of a display panel in the related art.

Therefore, based on the effects of the semiconductor retention layer 1131 below the data line 1141 on the parasitic capacitance in the case where there is light, the charging time of the pixel electrode in the sub-pixel P will be different in the cases where there is light and no light. As a result, in a case where the LCD panel in the related art displays an image by the light from a backlight assembly of a light-dark jump type, as the brightness of the light from the backlight assembly changes continuously, moving or stationary horizontal stripe patterns 2 will appear in the image as shown in FIG. 3D. Since an area of the horizontal stripe patterns 2 is large and is similar to a "water fall" in the image, a defect appearing in the image is also referred a water fall defect. The water fall defect will cause the whole display effect of the LCD panel to be greatly reduced. Especially in a case where the LCD panel displays an monochrome image, the water fall defect is more obvious.

Based on this, in a case where the array substrate 13 provided in embodiments of the present disclosure is applied to the display apparatus 1, since the first light-shielding layer 41 is disposed below the semiconductor retention layer 1131, light from the backlight assembly 12 (as shown by the dotted arrows in FIG. 2B) cannot pass through the first light-shielding layer 41 and then reach the semiconductor retention layer 1131, so that the material properties of the semiconductor retention layer 1131 may not change due to changes in light. That is, the semiconductor retention layer 1131 performs insulation properties in cases where there is light and no light, so that the magnitude of the parasitic capacitance in the array substrate 13 will not change due to the changes in light.

Figure 2E:
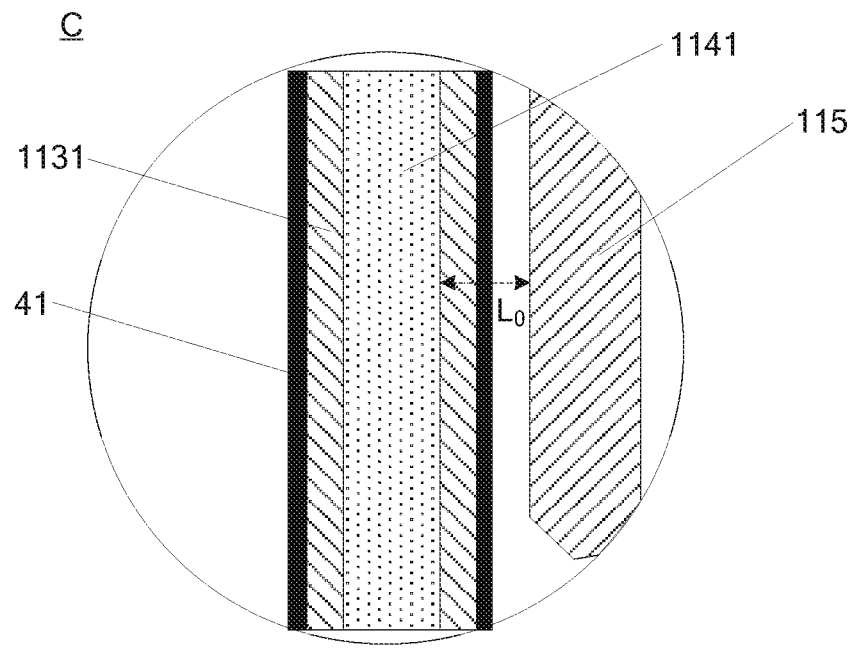
FIG. 2E is an enlarged schematic diagram showing a structure of a region C in FIG. 2A.

For example, as shown in FIG. 2E, for a parasitic capacitance between a data line 1141 and an adjacent pixel electrode 115, whether there is light or no light, the distance among the factors affecting the magnitude of the parasitic capacitance is always equal to $L_0$, and it will not change.

That is, the magnitude of the parasitic capacitance will not change due to the change of the light, so that the decay time of the voltage signal on the pixel electrode may be the same in the case where there is light or no light. In this way, the charging time of the pixel electrode in the sub-pixel P is also the same in the case where there is light or no light, therefore, the water fall defect in the image displayed by the LCD panel 11 may be averted, and the display effect of the LCD panel 11 may be improved.

In some embodiments, the first light-shielding layer 41 is made of a black insulating material or a black metal oxide. For example, the black insulating material includes a black matrix (BM) material, and the black metal oxide includes copper oxide (CuO).

The array substrate 13 includes the plurality of semiconductor retention layers 1131, and the semiconductor retention layers 1131 are conductive in the case where there is light. Therefore, in some embodiments, the at least one first light-shielding layer 41 includes a plurality of first light-shielding layers 41, and the plurality of first light-shielding layers 41 are in one-to-one correspondence with the plurality of semiconductor retention layers 1131. Each first light-shielding layer 41 is disposed between a corresponding semiconductor retention layer 1131 and the substrate 110, and an orthographic projection of each first light-shielding layer 41 on the substrate 110 covers an orthographic projection of the corresponding semiconductor retention layer 41 on the substrate 110.

Figure 4A:
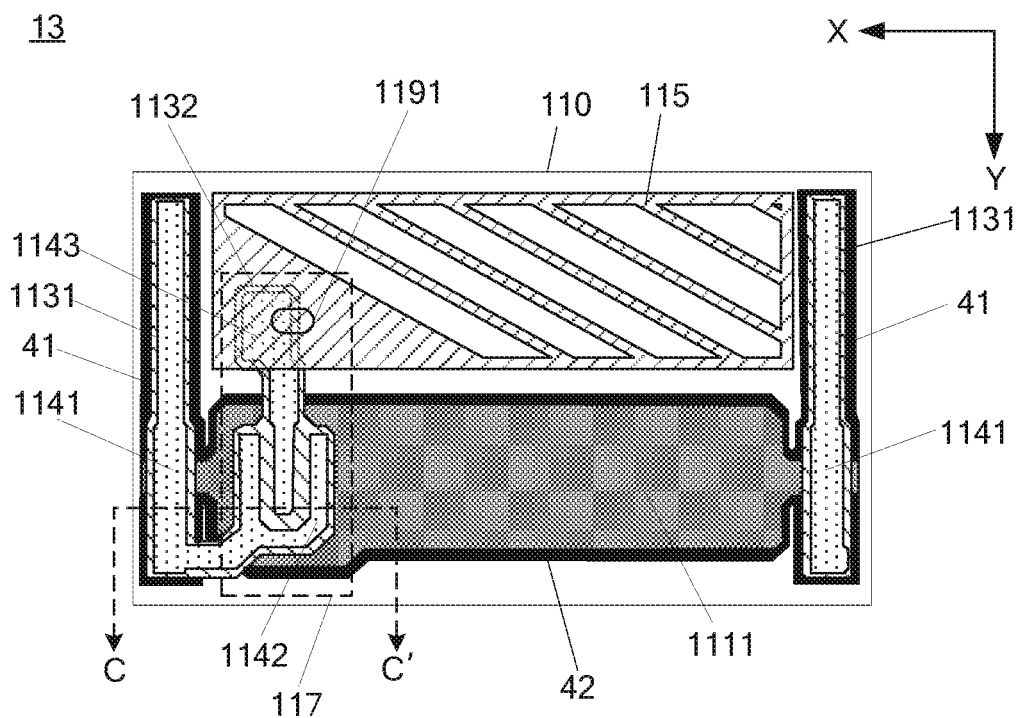
FIG. 4A is a schematic top view showing a structure of another array substrate, according to some embodiments of the present disclosure.
Figure 4B:
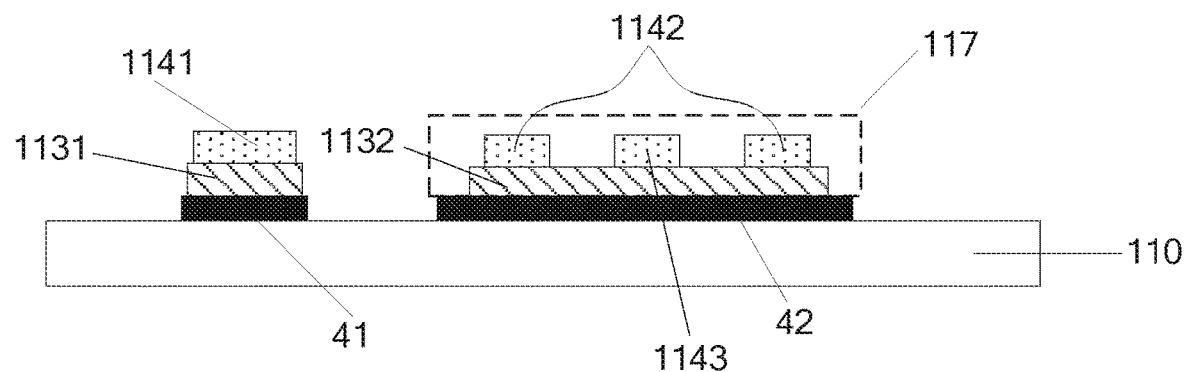
FIG. 4B is a schematic cross-sectional view showing a structure taken along line C-C' in FIG. 4A.
Figure 5A:
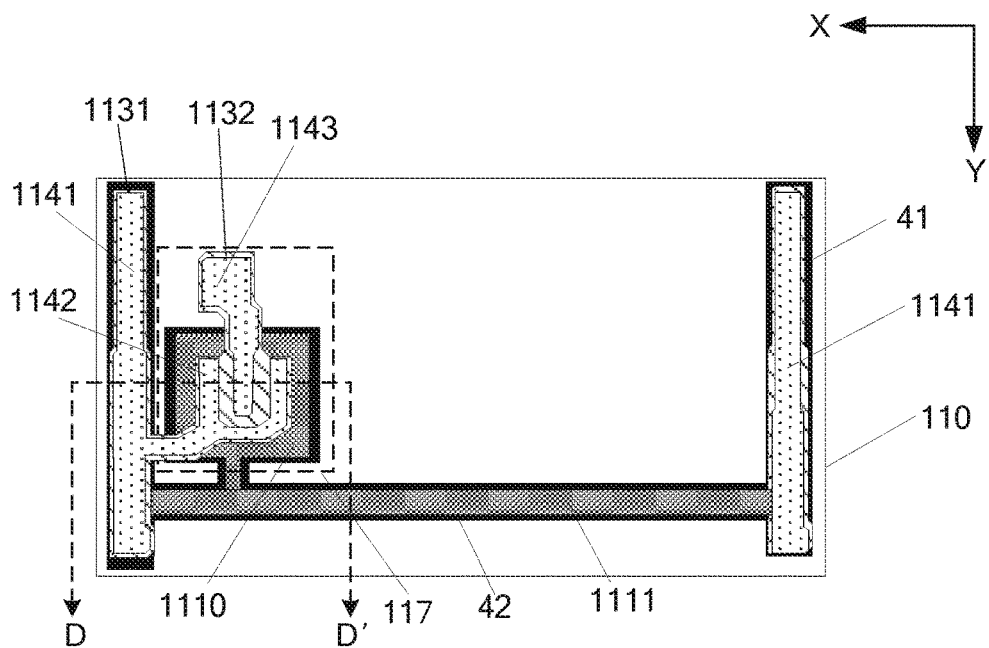
FIG. 5A is a schematic top view showing a structure of yet another array substrate, according to some embodiments of the present disclosure.

Moreover, a width of each first light-shielding layer 41 in the X direction is greater than or equal to a width of the corresponding semiconductor retention layer 1131 in a same direction. Similarly, a length of each first light-shielding layer 41 in the Y direction is greater than or equal to a length of the corresponding semiconductor retention layer 1131 in a same direction. In this way, it is possible to ensure that each semiconductor retention layer 41 is not irradiated by the light from the backlight assembly 12. In some embodiments, as shown in FIGS. 4A, 5A, and 5C, the array substrate 13 further includes at least one second light-shielding layer 42 disposed between the active layers 1132 of the plurality of transistors 117 and the substrate 110.

Moreover, one second light-shielding layer 42 of the at least one second light-shielding layer 42 is disposed between an active layer 1132 of one transistor 117 and the substrate 110, and an orthographic projection of the second light-shielding layer 42 on the substrate 110 covers an orthographic projection of an active portion of the active layer 1132 of the transistor 117 on the substrate 110.

It will be noted that, since each second light-shielding layer 42 generally has a certain pattern, the second light-shielding layer 42 may also be referred to as a second light-shielding pattern.

It will be understood that, for an overlapping manner between the orthographic projection of the active portion of the active layer 1132 of the transistor 117 on the substrate 110 and the orthographic projection of a corresponding second light-shielding layer 42 on the substrate 110, the overlapping manner is that: for example, the orthographic projection of the active portion of the active layer 1132 of the transistor 117 on the substrate 110 is within a boundary of the orthographic projection of the corresponding second light-shielding layer 42 on the substrate 110, that is, the orthographic projection is not beyond the boundaries.

For another example, the overlapping manner is that: along the thickness direction of the substrate 110, the orthographic projection of the active portion of the active layer 1132 of the transistor 117 on the substrate 110 completely overlaps with the orthographic projection of the corresponding second light-shielding layer 42 on the substrate 110.

It will be known from the foregoing description that, an active portion of an active layer 1132 of one transistor 117 is a channel region in the case where the transistor 117 is in an on-state. In this way, one second light-shielding layer 42 is disposed between the active layer 1132 of the transistor 117 and the substrate 110, so as to block the light from the backlight assembly 12 from irradiating the transistor 117, thereby ensuring that the electrical performance of the transistor 117 may not change due to the light.

In some embodiments, the at least one second light-shielding layer 42 is made of a black insulating material or a black metal oxide. For example, the black insulating material includes a black matrix (BM) material, and the black metal oxide includes a copper oxide (CuO).

Since the second light-shielding layer 42 and the first light-shielding layer 41 both have a light-shielding effect, in order to further simplify the manufacturing process, in some embodiments, the first light-shielding layer 41 and the second light-shielding layer 42 are in a same layer. In other embodiments, the first light-shielding layer 41 and the second light-shielding layer 42 are made of a same material. In yet other embodiments, the first light-shielding layer 41 and the second light-shielding layer 42 are in a same layer and are made of a same material, in this case, the first light-shielding layer 41 and the second light-shielding layer 42 may be directly connected to form an integrated structure.

Furthermore, since the array substrate 13 includes the plurality of transistors 117, in some embodiments, the at least one second light-shielding layer 42 includes a plurality of second light-shielding layer 42. In this way, the plurality of second light-shielding layers 42 are capable of blocking the light from the backlight assembly 12 from irradiating each transistor 117.

For example, a corresponding manner between the plurality of second light-shielding layers 42 and the plurality of transistors 117 is that the plurality of second light-shielding layers 42 are in one-to-one correspondence with the plurality of transistors 117, each second light-shielding layer 42 is disposed between an active layer 1132 of a corresponding transistor 117 and the substrate 110, and an orthographic projection of each second light-shielding layer 42 on the substrate 110 covers an orthographic projection of the active portion of the active layer 1132 of the corresponding transistor 117 on the substrate 110.

Considering that the plurality of transistors 117 in the array substrate 13 are generally arranged in an array, and the number of the transistors 117 is large, in order to further simplify the manufacturing process, as shown in FIGS. 4A, 5A and 5C, the corresponding manner between the plurality of second light-shielding layers 42 and the plurality of transistors 117 is that, each second light-shielding layer 42 is disposed between active layers 1132 of a row of transistors 117 and the substrate 110, and the orthographic projection of each second light-shielding layer 42 on the substrate 110 covers orthographic projections of active portions of the active layers 1132 of the row of transistors 117 on the substrate 110.

In some embodiments, as shown in FIGS. 4A, 5A and 5C, the orthographic projection of each second light-shielding layer 42 on the substrate 110 further covers all of orthographic projections of gates 1110 of the row of transistors 117 on the substrate, and an orthographic projection of a gate line 1111 electrically connected to the gates 1110 of the row of transistors 117 on the substrate 110. In this way, the second light-shielding layers 42 may absorb or reflect the light from the backlight assembly 12, so as to further prevent the light from entering the transistors 117.

Figure 5B:
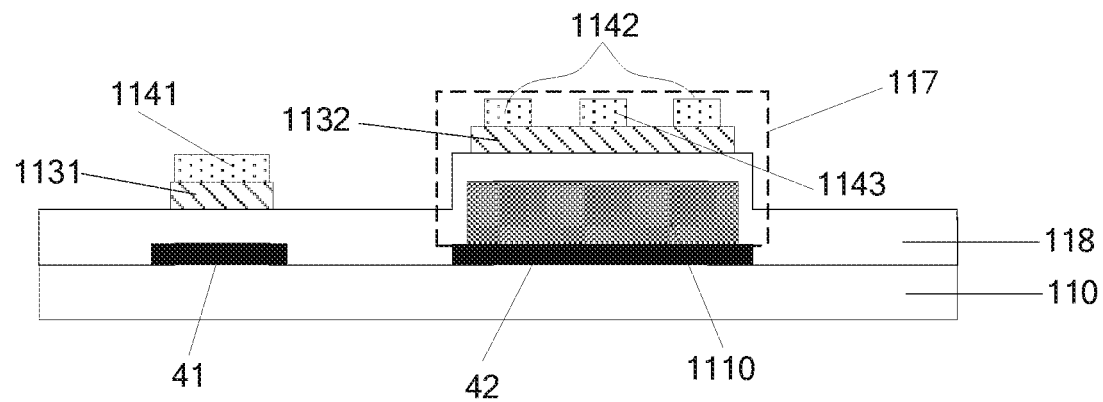
FIG. 5B is a schematic cross-sectional view showing a structure taken along line D-D' in FIG. 5A.
Figure 5C:
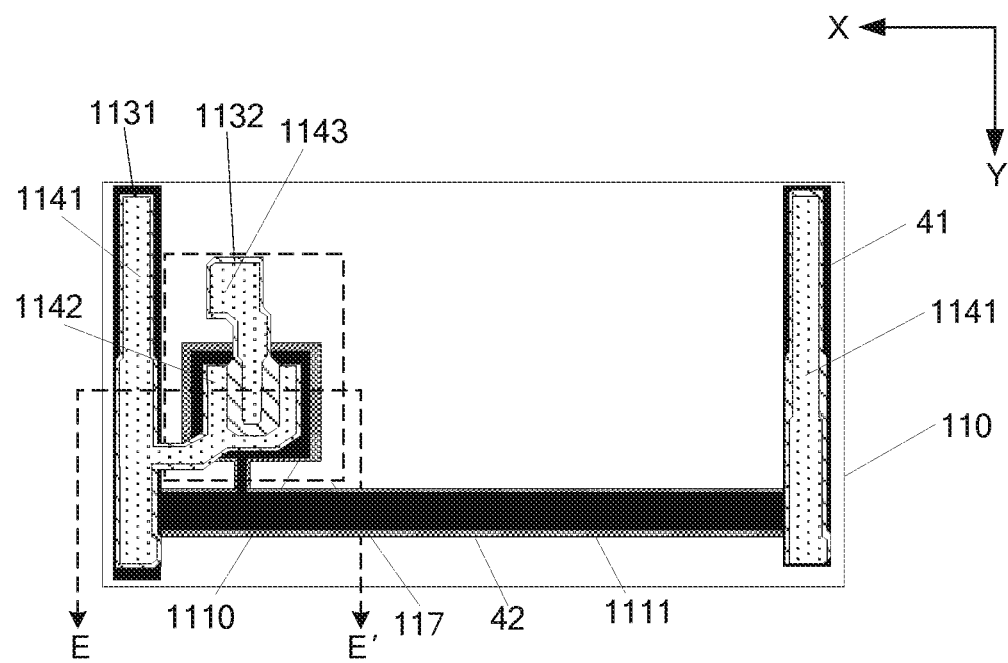
FIG. 5C is a schematic top view showing a structure of yet another array substrate, according to some embodiments of the present disclosure.

In some examples, as shown in FIG. 5B, each second light-shielding layer 42 is disposed on a side of corresponding gates 1110 and one gate line 1111 facing the substrate 110.

In this way, in a case where the first light-shielding layers 41 and the second light-shielding layers 42 are in a same layer, and the gates 1110 and the gate lines 1111 are in a same layer, the two layers may be formed in a same patterning process by a same semi-transparent mask plate, which further simplifies the manufacturing process.

Figure 5D:
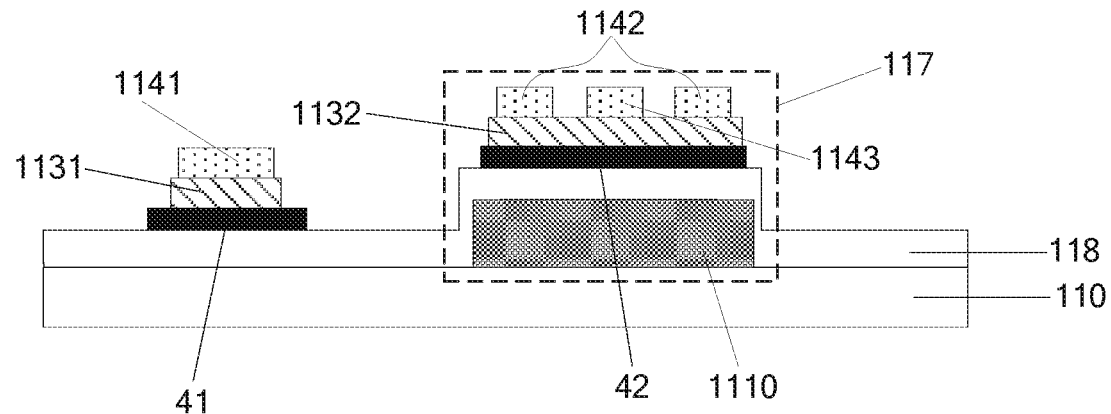
FIG. 5D is a schematic cross-sectional view showing a structure taken along line E-E' in FIG. 5C.

In some embodiments, as shown in FIG. 5D, the array substrate 13 further includes a gate insulating layer 118 disposed between the gates 1110 of the plurality of transistors 117 and the active layers 1132 of the plurality of transistors 117.

It will be understood that, the gate insulating layer 118 is a whole layer to separate the plurality of gates 1110 and the plurality of active layers 1132.

For example, the second light-shielding layers 42 are disposed on a side of the active layers 1132 of the plurality of transistors 117 facing the gate insulating layer 118. In this way, in a case where the first light-shielding layers 41 and the second light-shielding layers 42 are in a same layer, the semiconductor retention layers 1131 and the active layers 1132 are in a same layer, and the sources 1142, the drains 1143, and the data lines 1141 are in a same layer, the three layers may be formed in a same patterning process by a same semi-transparent mask plate, which further simplifies the manufacturing process.

Specifically, as shown in FIG. 5D, each second light-shielding layer 42 is disposed between corresponding active layers 1132 and the gate insulating layer 118. In this way, in a process of manufacturing the first light-shielding layers 41, the second light-shielding layers 42, the data lines 1141, the gate lines 1111, and the transistors 117, only two semi-transparent mask plates are used (i.e., two patterning processes), which further simplifies the manufacturing process.

Figure 6A:
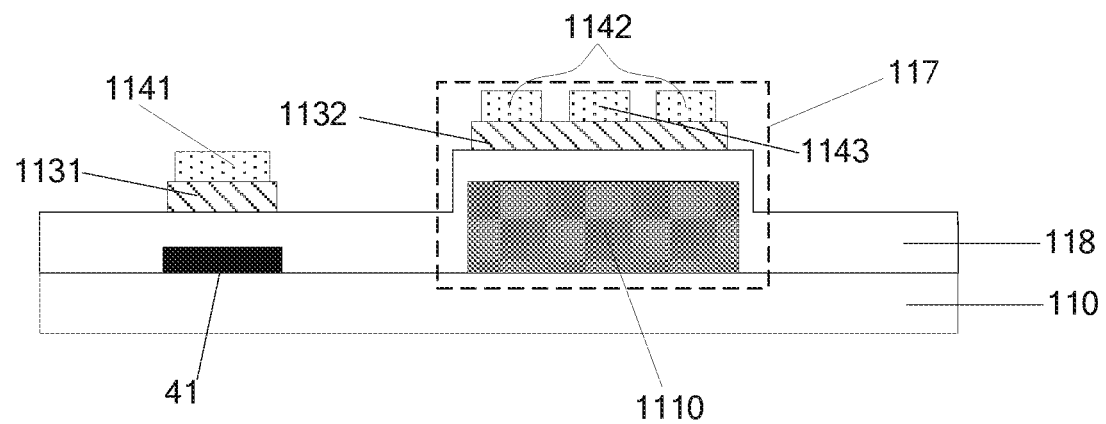
FIG. 6A is another schematic cross-sectional view showing a structure taken along line A-A' in FIG. 2A.

Furthermore, as shown in FIG. 6A, some embodiments of the present disclosure provide another array substrate 13.

As shown in FIG. 6A, each first light-shielding layer 41 is disposed between the gate insulating layer 118 and the substrate 110, and there is no second light-shielding layer between each gate 1110 and the substrate 110.

In a process of manufacturing the array substrate 13 shown in FIG. 6A, since the first light-shielding layers 41, the gates 1110 and the gate lines 1111 are all disposed on a surface of the substrate 110, or on a surface of the same layer (e.g., a buffer layer) on the substrate 110, it is necessary to use one mask to manufacture the gates 1110 and the gate lines 1111, and to use another mask to manufacture the first light-shielding layers 41.

Figure 6B:
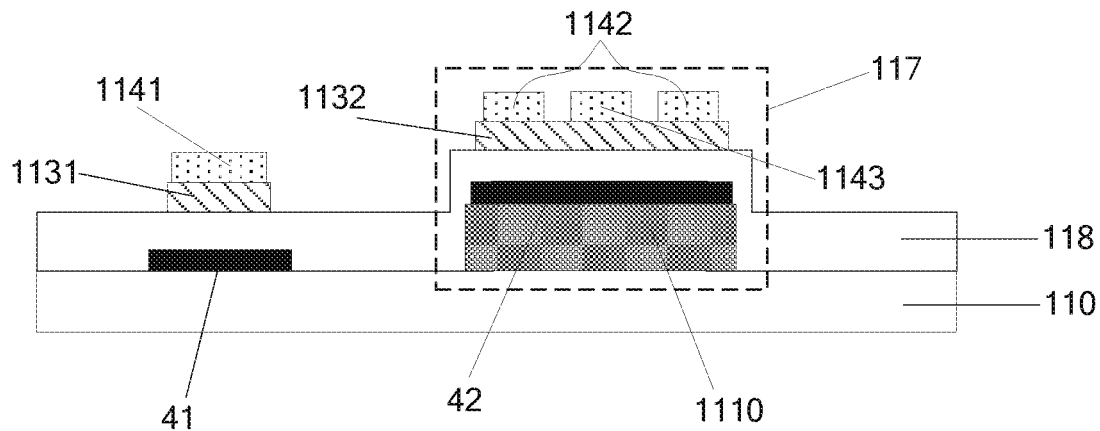
FIG. 6B is another schematic cross-sectional view showing a structure taken along line E-E' in FIG. 5D.

As shown in FIG. 6B, some embodiments of the present disclosure provide yet another array substrate 13, each first light-shielding layer 41 is disposed between the gate insulating layer 118 and the substrate 110, and each second light-shielding layer 42 is disposed between the gate insulating layer 118 and a corresponding gate 1110.

In a process of manufacturing the array substrate 13 shown in FIG. 6B, since the first light-shielding layers 41, the gates 1110 and the gate lines 1111 are all disposed on a surface of the substrate 110, or on a surface of a same layer (e.g., a buffer layer) on the substrate 110, it is necessary to use one mask to manufacture the gates 1110 and the gate lines 1111, and to use another mask to manufacture the first light-shielding layers 41 and the second light-shielding layers 42.

Figure 7:
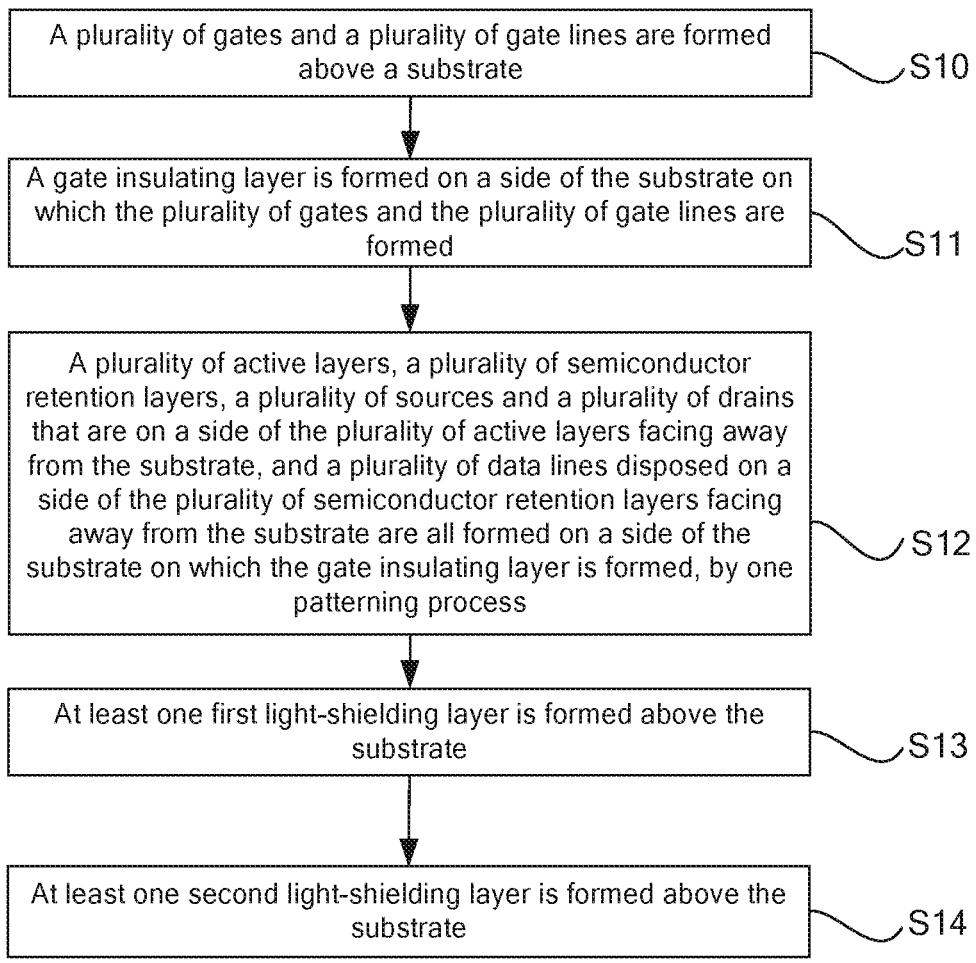
FIG. 7 is a flow diagram of a method of manufacturing an array substrate, according to some embodiments of the present disclosure.

Base on this, in some embodiments of the present disclosure, a method of manufacturing an array substrate 13 is provided for manufacturing the array substrate 13 provided by the above embodiments. As shown in FIG. 7, the method includes step 10 to step 12 (S10 to S12).

Figure 8A:
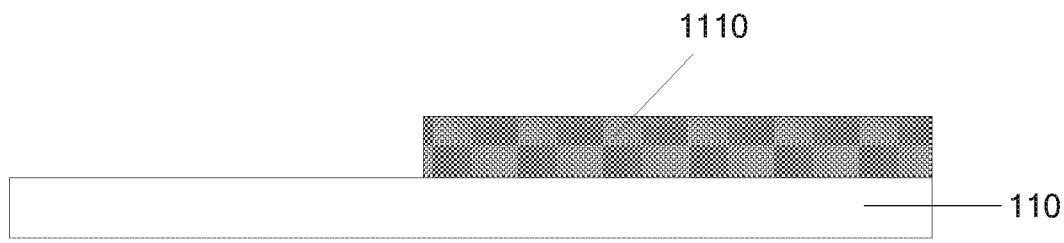
FIGS. 8A to 8E are schematic diagrams showing a process of manufacturing an array substrate, according to some embodiments of the present disclosure.

In S10: as shown in FIG. 8A, a plurality of gates 1110 and a plurality of gate lines 1111 are formed above a substrate 110. For example, a first conductive thin film is formed above the substrate 110, and then the first conductive thin film is etched by a patterning process to form the gates 1110 and the gate lines 1111.

The first conductive thin film is generally made of a metal material with low resistivity such as copper or copper alloy.

For convenience of description, the first conductive thin film is hereinafter referred to as a gate metal thin film.

A row of gates 1110 is electrically connected to a corresponding gate line 1111, For example, the row of gates 1110 is a portion of the corresponding gate line 1111. Of course, the row of gates 1110 may also be independent from the corresponding gate line 1111, which is also permissible.

It will be noted that FIG. 8A only schematically shows a single gate 1110 in a single sub-pixel P.

In some examples, the plurality of gates 1110 and the plurality of gate lines 1111 may be directly formed on the surface of the substrate 110. In other examples, before S10 is performed, the method further includes step(s) of forming other layer(s) (e.g., a buffer layer) on the substrate 110. Correspondingly, the plurality of gates 1110 and the plurality of gate lines 1111 may be directly formed on surfaces of the other layer(s).

Figure 8B:
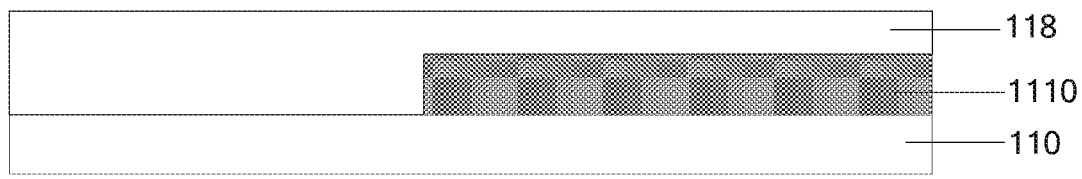

In S11: as shown in FIG. 8B, a gate insulating layer 118 is formed on a side of the substrate 110 on which the plurality of gates 1110 and the plurality of gate lines 1111 are formed.

Specifically, the gate insulating layer 118 is a whole layer and covers the gates 1110 and the gate lines 1111.

Figure 8C:
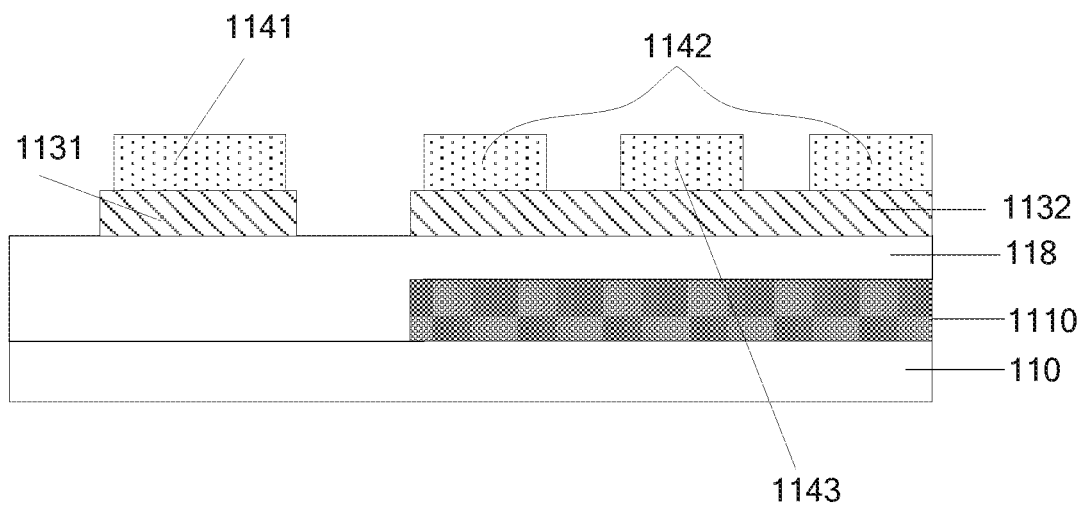

In S12: as shown in FIG. 8C, a plurality of active layers 1132, a plurality of semiconductor retention layers 1131, a plurality of sources 1142 and a plurality of drains 1143 that are on a side of the plurality of active layers 1132 facing away from the substrate 110, and a plurality of data lines 1141 disposed on a side of the plurality of semiconductor retention layers 1131 facing away from the substrate 110 are all formed on a side of the substrate 110 on which the gate insulating layer 118 is formed by one patterning process.

Here, the plurality of data lines 1141 are in one-to-one correspondence with the plurality of semiconductor retention layers 1131, and an orthographic projection of each data line 1141 on the substrate 110 overlaps with an orthographic projection of a corresponding semiconductor retention layer 1131 on the substrate 110. The description of the overlapping manners may be referred to the foregoing embodiments, which will not be described herein again.

It will be noted that, FIG. 8C only schematically shows one active layer 1132, one source 1142 and one drain 1143 that are in one sub-pixel P, one semiconductor retention layer 1131 and one data line 1141 disposed on a side of the semiconductor retention layer 1131 facing away from the substrate 110.

Specifically, in S12, a semiconductor thin film and a second conductive thin film are formed on the gate insulating layer 118 in sequence, and then the semiconductor thin film and the second conductive thin film are etched to form the active layers 1132, the semiconductor retention layers 1131, the sources 1142 and the drains 1143.

The second conductive thin film is generally made of a metal material with low resistivity such as copper or copper alloy. For convenience of description, the second conductive thin film is hereinafter referred to as a source metal thin film.

It will be understood that, since the active layers 1132, the semiconductor retention layers 1131, the sources 1142, the drains 1143 and the data lines 1141 are all formed in a same patterning process, the active layers 1132 and the semiconductor retention layers 1131 are in a same layer and made of a same material. The sources 1142, the drains 1143 and the data lines 1141 are in a same layer and made of a same material.

Before the semiconductor retention layers 1131 are formed, as shown in FIG. 7, the method further includes step 13 (S13).

Figure 8D:
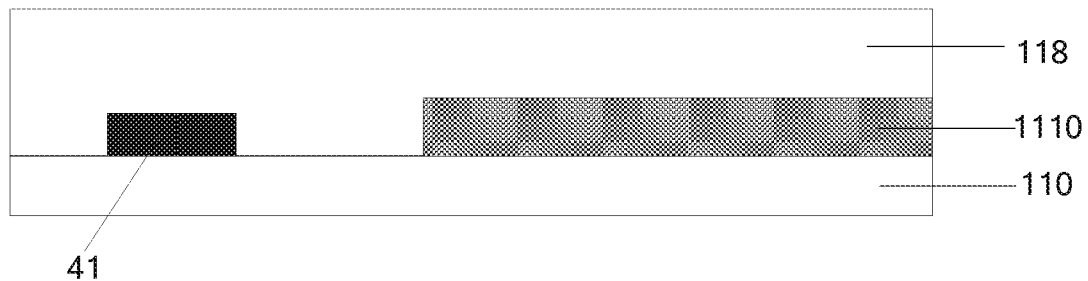
Figure 8E:
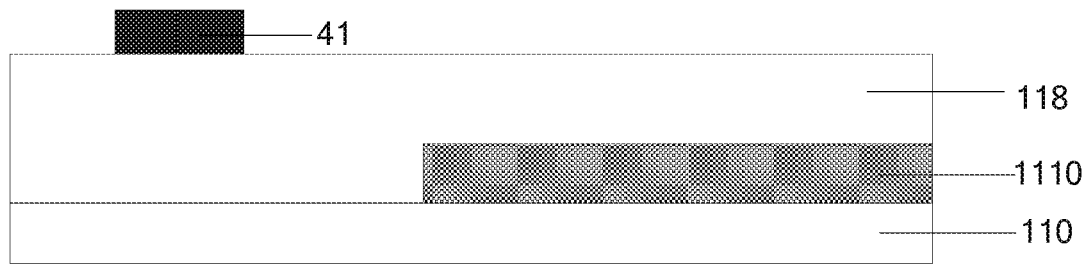

In S13: as shown in FIG. 8D or 8E, at least one first light-shielding layer 41 is formed above the substrate 110.

Here, one first light-shielding layer 41 of the at least first light-shielding layers 41 is disposed between one semiconductor retention layer 1131 to be formed and the substrate 110, and an orthographic projection of the first light-shielding layer 41 on the substrate 110 covers an orthographic projection of the semiconductor retention layer 1131 on the substrate 110. The description of the covering manners may be referred to the foregoing embodiments, which will not be described herein again.

For example, the at least one first light-shielding layer 41 includes a plurality of first light-shielding layers 41. The plurality of first light-shielding layers 41 are in one-to-one correspondence with the plurality of semiconductor retention layers 1131 to be formed. Each first light-shielding layer 41 is disposed between a corresponding semiconductor retention layer 1131 and the substrate 110, and an orthographic projection of each first light-shielding layer 41 on the substrate 110 covers an orthographic projection of the corresponding semiconductor retention layer 1131 on the substrate 110.

Specifically, in S13, the first light-shielding layer 41 is obtained by first forming a light-shielding thin film and then etching the light-shielding thin film.

It will be noted that, as long as it is ensured that S13 is performed before forming the semiconductor retention layers 1131, S13 may be a separate step, or S13 may be performed at a same time of performing other step(s), which is not limited herein.

Based on this, in the method of manufacturing the array substrate 13 provided by embodiments of the present disclosure, by forming the first light-shielding layer 41 before the semiconductor retention layer 1131, an array substrate 13 provided with the first light-shielding layer 41 may be manufactured. In this way, material properties of the semiconductor retention layer 1131 will be not affected by the light, and electrical performance of the array substrate 13 may be improved.

A plurality of transistors 117 may be formed by performing 311 and S12. The plurality of transistors 117 may be arranged in an array. Gates 1110 of each row of transistors 117 are electrically connected to a gate line 1111.

Each transistor 117 includes a gate 1110, an active layer 1132, a source 1142 and a drain 1143. Each active layer 1132 includes an active portion corresponding to a region between the source 1142 and the drain 1143 in a same transistor 117.

Before the active layers 1132 are formed, as shown in FIG. 7, the method further includes step 14 (314).

In S14: at least one second light-shielding layer 42 is formed above the substrate 110.

Here, one second light-shielding layer 42 of the at least one second light-shielding layer 42 is disposed between one active layer 1132 to be formed and the substrate 110. An orthographic projection of the second light-shielding layer 42 on the substrate 110 covers an orthographic projection of the active portion of the active layer 1132 on the substrate 110. The description of the covering manners may be referred to the foregoing embodiments, which will not be described herein again.

For example, the at least one second light-shielding layer 42 includes a plurality of second light-shielding layers 42. The plurality of second light-shielding layers 42 are in one-to-one correspondence with the plurality of active layers 1132 to be formed. For another example, each second light-shielding layer 42 corresponds to a row of transistors 117 and a gate line 1111 electrically connected to the row of transistors 117.

Specifically, in S14, the second light-shielding layer 41 is obtained by first forming a light-shielding thin film and then etching the light-shielding thin film.

It will be noted that as long as it is ensured that 314 is performed before forming the active layer 1131. S14 may be a separate step, or S14 may be performed at a same time of performing other steps, which is not limited herein.

In some embodiments, the at least one first light-shielding layer 41 (e.g., a plurality of first light-shielding layers 41) and the at least one second light-shielding layer 42 (e.g., a plurality of second light-shielding layers 42) in a same layer, a plurality of gates 1110 and a plurality of gate lines 1111 in a same layer are all formed by one patterning process, so as to further simplify the manufacturing process.

Specific processes are as follows.

Figure 9A:
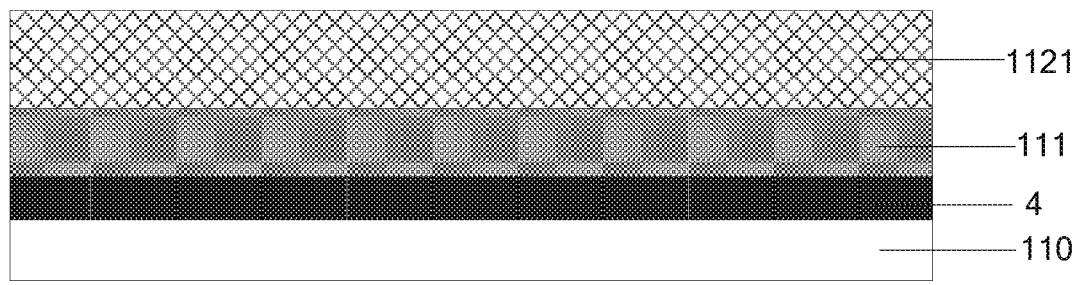
FIGS. 9A to 9E are schematic diagrams showing a process of manufacturing another array substrate, according to some embodiments of the present disclosure.

As shown in FIG. 9A, a light-shielding thin film 4, a gate metal thin film 111, and a first photoresist thin film 1121 are formed on the substrate 110 in sequence.

Figure 9B:
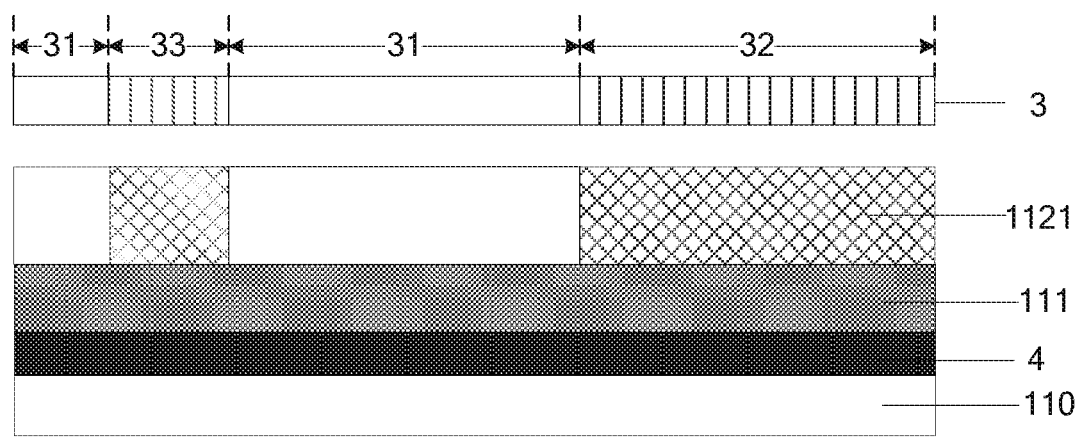

As shown in FIG. 9B, the first photoresist thin film 1121 is exposed by using of a semi-transparent mask 3.

The semi-transparent mask 3 is composed of regions with different ultraviolet (UV) light transmittance. According to different required photoresist patterns, the semi-transparent mask 3 is composed of at least one full-transmitting region 31, at least one light-shielding region 32 and at least one semi-transmitting region 33.

For example, the semi-transparent mask 3 is a half tone mask (HTM) or a single slit mask (SSM).

After the first photoresist thin film 1121 is exposed by using of the semi-transparent mask 3, the first photoresist thin film 1121 will form a first portion corresponding to each full-transmitting region 31, a second portion corresponding to each light-shielding region 32 and a third portion corresponding to each semi-transmitting region 33 according to different transmittance of UV light after passing through different regions of the semi-transparent mask 3. The material property of the first portion is completely changed, the material property of the second portion remains unchanged, and the material property of the third portion is partially changed.

After the exposed first photoresist thin film 1121 is developed, the first portion is completely removed, the second portion is reserved, and the third portion is partially removed to form a half reserved portion. After the first portion is removed, a portion of the gate metal thin film 111 corresponding to the first portion will be exposed.

Figure 9C:
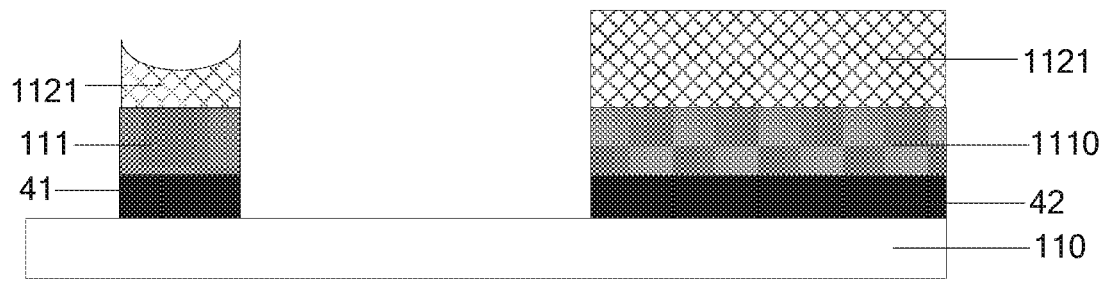

As shown in FIG. 9C, the exposed portion of the gate metal thin film 111 and a corresponding portion of the light-shielding thin film 4 are removed by using a first etching process, so as to form the first light-shielding layer 41, the second light-shielding layer 42 and the gate 1110 and the gate 1111 disposed on a side of the second light-shielding layer 42 facing away from the substrate 110.

Figure 9D:
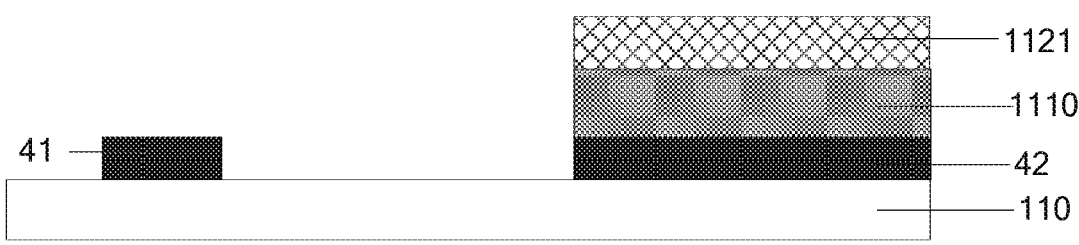

As shown in FIG. 9D, the half reserved portion is removed by an ashing process (e.g., a plasma bombardment process). After the half reserved portion is removed, a portion of the gate metal thin film 111 corresponding to the half reserved portion will be exposed.

Then, the exposed portion of the gate metal thin film 111 is removed by using a second etching process.

Figure 9E:
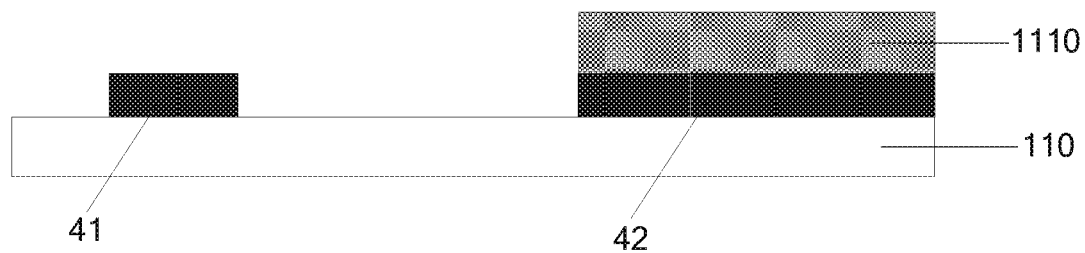

As shown in FIG. 9E, the remaining second portion is removed by an ashing process (e.g., a plasma bombardment process), thereby exposing the first light-shielding layer 41, the gate 1110 and the gate line 1111.

It will be noted that, the above processes are described by taking the first photoresist thin film 1121 made of a positive photoresist material as an example. In some examples, the first photoresist thin film 1121 may be made of a negative photoresist material. Since exposure and development properties of the negative photoresist material and the positive photoresist material are completely opposite, in this case, positions of the full-transmitting region 31, the light-shielding region 32 and the semi-transmitting region 33 of the corresponding semi-transparent mask 3 need to be adjusted accordingly, and the specific processes will not be described in detail.

Based on this, a same semi-transparent mask 3 may be used in a process of manufacturing the first light-shielding layer 41, the second light-shielding layer 42, the gate 1110 and the gate line 1111.

In other embodiments, the at least one first light-shielding layer 41 (e.g., a plurality of first light-shielding layers 41) and the at least one second light-shielding layer 42 (e.g., a plurality of second light-shielding layers 42) in a same layer, a plurality of active layers 1132 and a plurality of semiconductor retention layers 1131 in a same layer, and a plurality of sources 1142, a plurality of drains 1143 and a plurality of data lines 1141 in a same layer are all formed by one patterning process to further simplify the manufacturing process.

Specific processes are as follows.

Figure 10A:
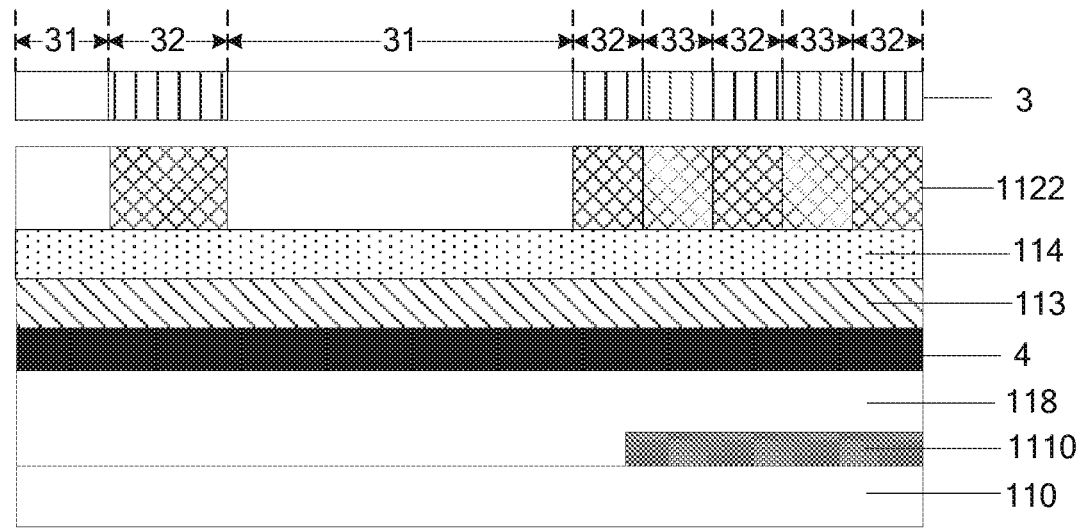
FIGS. 10A to 10E are schematic diagrams showing a process of manufacturing yet another array substrate, according to some embodiments of the present disclosure.

As shown in FIG. 10A, a light-shielding thin film 4, a semiconductor thin film 113, a source metal thin film 114, and a second photoresist thin film 1122 are formed on the substrate 110 in sequence.

Then, the second photoresist thin film 1122 is exposed by using of the semi-transparent mask 3 to form a first portion corresponding to each full-transmitting region 31 of the semi-transparent mask 3, a second portion corresponding to each light-shielding region 32 of the semi-transparent mask 3, and a third portion corresponding to each semi-transmitting region 33 of the semi-transparent mask 3. The material property of the first portion is completely changed, the material property of the second portion remains unchanged, and the material property of the third portion is partially changed.

Figure 10B:
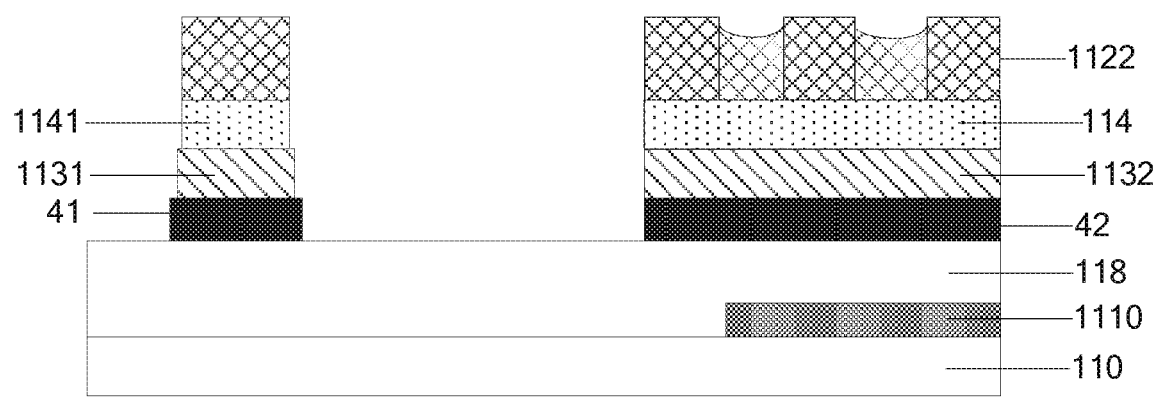

As shown in FIG. 10B, after the exposed second photoresist thin film 1122 is developed, the first portion is completely removed, the second portion is reserved, and the third portion is partially removed to form a half reserved portion. After the first portion is removed, a portion of the source metal thin film 114 corresponding to the first portion will be exposed.

Then, the exposed portion of the source metal thin film 114, a portion of the semiconductor thin film 113 corresponding to the exposed portion and a portion of the light-shielding thin film 4 corresponding to the exposed portion are removed by using a first etching process, so as to form the first light-shielding layer 41, the semiconductor retention layer 1131 on a side of the first light-shielding layer 41 facing away from the substrate 10, the second light-shielding layer 42, and the active layer 1132 on a side of the second light-shielding layer 42 facing away from the substrate 10.

Figure 10C:
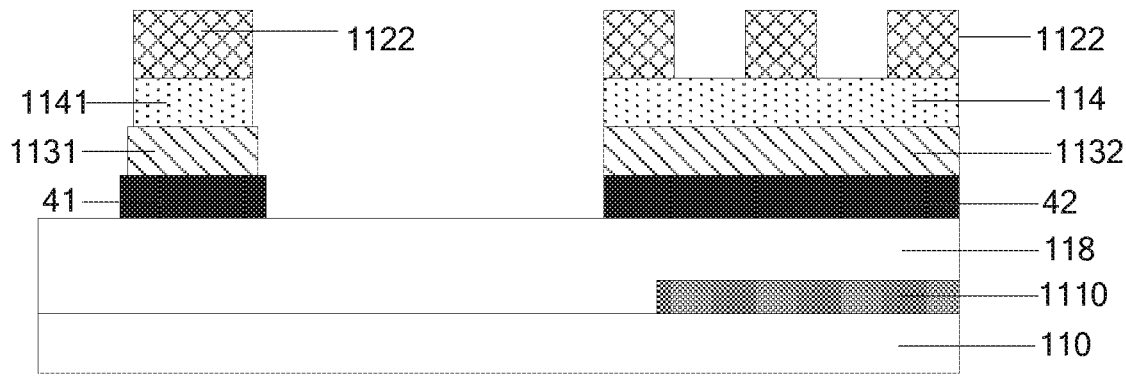

As shown in FIG. 10C, the half reserved portion is removed by an ashing process (e.g., a plasma bombardment process). After the half reserved portion is removed, the portion of the source metal thin film 114 corresponding to the half reserved portion will be exposed.

Figure 10D:
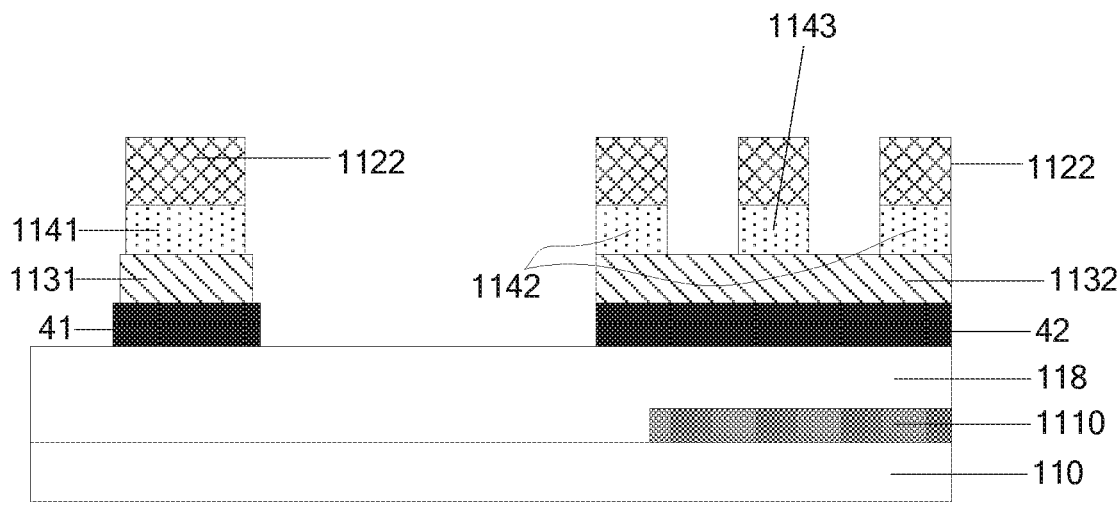

As shown in FIG. 10D, the exposed portion of the source metal thin film 114 is removed by using a second etching process to form the source 1142 and drain 1143 of the transistor 117, and the data line 1141.

Figure 10E:
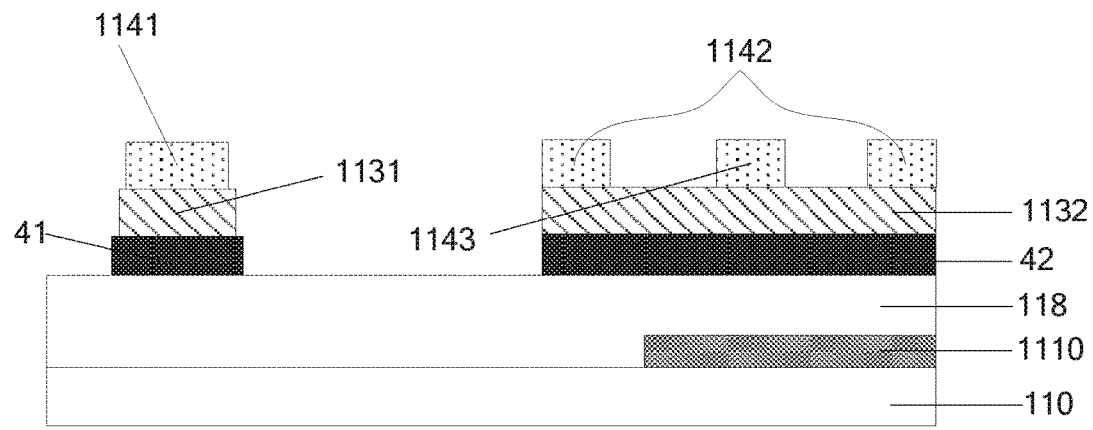

As shown in FIG. 10E, the remaining second portion is removed by an ashing process (e.g., a plasma bombardment process), thereby exposing the source 1142, the drain 1143 and the data line 1114.

It will be noted that, the specific description of the semi-transparent mask 3 may be referred to the foregoing embodiments, which will not be described herein again.

Moreover, the above processes are described by taking the second photoresist thin film 1122 made of a positive photoresist material as an example. In some examples, the second photoresist thin film 1122 may also be made of a negative photoresist material. Since exposure and development properties of the negative photoresist material and the positive photoresist material are completely opposite, in this case, positions of the full-transmitting region 31, the light-shielding region 32 and the semi-transmitting region 33 of the corresponding semi-transparent mask 3 need to be adjusted accordingly, and the specific processes will not be described in detail.

Based on this, a same semi-transparent mask 3 may be used in a process of manufacturing the first light-shielding layer 41, the second light-shielding layer 42, the semiconductor retention layer 1131, the active layer 1132, the source 1142, the drain 1143 and the data line 1141.

In some embodiments, the method of manufacturing the array substrate 13 further includes the following steps.

As shown in FIG. 2C, a passivation layer 119 is formed on a side of the plurality of transistors 117 facing away from the substrate 110, and a plurality of pixel electrodes 115 are formed on the passivation layer 119.

A plurality of through holes 1191 are formed in the passivation layer 119. Each pixel electrode 115 is electrically connected to a drain 1143 of one transistor 117 through one through hole 1191. In this way, a mask is required in a process of manufacturing the passivation layer 119 with the through holes 1191.

Each pixel electrode 115 is a comb structure including a plurality of strip-shaped electrodes. In this way, a mask is required in a process of manufacturing the pixel electrode 115 having the comb structure.

Based on this, in a case where the first light-shielding layers 41, the second light-shielding layers 42, the gates 1110 and the gate lines 1111 are formed by one patterning process, one mask (i.e., a semi-transparent mask) is used in the process of manufacturing the first light-shielding layers 41 and the second light-shielding layers 42 and in the process of manufacturing the gates 1110 and the gate lines 1111; one mask is used in the process of forming the active layers 1132, the semiconductor retention layers 1131, the sources 1142, the drains 1143 and the data lines 1141; one mask is used in the process of forming the passivation layer 119 with the through holes 1191; and one mask is used in the process of forming the pixel electrodes 115 with the comb structures. Therefore, only four masks are required in the process of manufacturing the array substrate 13 with the first light-shielding layers 41 and the second light-shielding layers 42, thereby further simplifying the manufacturing process.

Similarly, in a case where the first light-shielding layers 41, the second light-shielding layers 42, the active layers 1132, the semiconductor retention layers 1131, the sources 1142, the drains 1143 and the data lines 1141 are formed by one patterning process, one mask (i.e. a semi-transparent mask) is used in the process of manufacturing the first light-shielding layers 41 and the second light-shielding layers 42, and in the process of manufacturing the active layers 1132, the semiconductor retention layers 1131, the sources 1142, the drains 1143 and the data lines 1141; one mask is used in the process of forming the gates 1110 and the gate lines 1111; one mask is used in the process of forming the passivation layer 119 with the through holes 1191; and one mask is used in the process of forming the pixel electrodes 115 with the comb structures. Therefore, only four masks are required in the process of manufacturing the array substrate 13 with the first light-shielding layers 41 and the second light-shielding layers 42, thereby further simplifying the manufacturing process.

Figure 11:
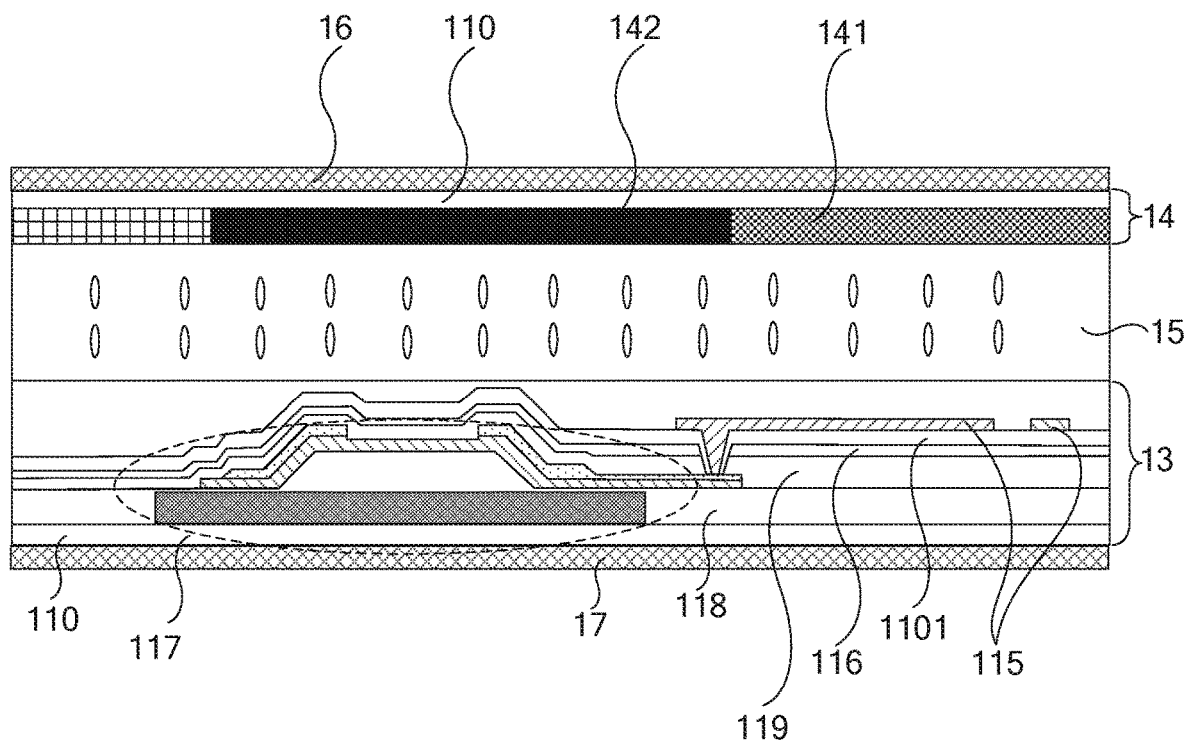
FIG. 11 is a schematic diagram showing a structure of a display panel, according to some embodiments of the present disclosure.

Based on the above, as shown in FIG. 11, the LCD panel 11 includes the above array substrate 13, an opposing substrate 14 disposed opposite to the array substrate 13, and a liquid crystal (LC) layer 15 disposed between the array substrate 13 and the opposing substrate 14.

In some examples, as shown in FIG. 11, the opposing substrate 14 includes a color filter layer 141 disposed on the substrate 110, in this case, the opposing substrate 14 may also be referred a color filter (CF).

The color filter layer 141 includes a plurality of filter units of a first color, a plurality of filter units of a second color, and a plurality of filter units of a third color. Each filter unit of the first color is disposed in a corresponding sub-pixel P, each filter unit of the second color is disposed in a corresponding sub-pixel P, and each filter unit of the third color is disposed in a corresponding sub-pixel P. For example, the filter unit of the first color is a filter block of the first color, the filter unit of the second color is a filter block of the second color, and the filter unit of the third color is a filter block of the third color. The first color, the second color and the third color are three primary colors (e.g., red, green and blue).

The opposing substrate 14 further includes a black matrix (BM) layer 142 disposed on the substrate 110. The BM layer 142 is used for spacing each filter unit of the first color, each filter unit of the second color, and each filter unit of the third color from each other.

In other examples, the array substrate 13 further includes a color filter (CF) layer, that is, the array substrate 13 is a color filter on array (COA) substrate. In this case, the opposing substrate 14 is a cover plate (e.g., a glass plate).

As shown in FIG. 11, the LCD panel 11 further includes a first polarizer 16 (i.e., also referred to as an upper polarizer) disposed on a side of the opposing substrate 14 facing away from the LC layer 15, and a second polarizer 17 (i.e., also referred to as a lower polarizer) disposed on a side of the array substrate 13 facing away from the LC layer 15.

The LCD panel 11 has the same beneficial effects as the array substrate 13, which will not be described herein again.

In the description of the above embodiments, specific features, structures, materials or properties may be combined in a suitable manner in any one or more embodiments or examples.

The forgoing descriptions are merely specific implementation manners of the present disclosure, but the protection scope of the present disclosure is not limited thereto. Any person skilled in the art could conceive of changes or replacements within the technical scope of the present disclosure, which shall all be included in the protection scope of the present disclosure. Therefore, the protection scope of the present disclosure shall be subject to the protection scope of the claims.

What is claimed is:

1. An array substrate, comprising:
   a substrate;

at least one first light-shielding layer disposed above the substrate;
a plurality of semiconductor retention layers disposed on a side of the at least one first light-shielding layer facing away from the substrate;
a plurality of data lines disposed on a side of the plurality of semiconductor retention layers facing away from the at least one first light-shielding layer;
a plurality of transistors disposed above the substrate;
at least one second light-shielding layer; and
a gate insulating layer; wherein
one first light-shielding layer of the at least one first light-shielding layer is disposed between one semiconductor retention layer of the plurality of semiconductor retention layers and the substrate, and a boundary of an orthographic projection of the first light-shielding layer on the substrate coincides with a boundary of an orthographic projection of the semiconductor retention layer on the substrate;
the plurality of data lines are in one-to-one correspondence with the plurality of semiconductor retention layers, and an orthographic projection of each data line on the substrate overlaps with an orthographic projection of a corresponding semiconductor retention layer on the substrate;
each transistor includes: a gate, an active layer on a side of the gate facing away from the substrate, and a first electrode and a second electrode that are on a side of the active layer facing away from the substrate; the active layer of each transistor includes an active portion corresponding to a region between the first electrode and the second electrode of a same transistor; and a planar shape of each transistor is U-shaped, the first electrode includes two strip-shaped portions opposite to each other, and a connection portion on a same side of the two strip-shaped portions and connecting the two strip-shaped portions, so that a planar shape of the first electrode is substantially U-shaped, the second electrode is strip-shaped, and a portion of the second electrode extends into a region between the two strip-shaped portions of the first electrode;
the plurality of data lines, and first electrodes and second electrodes of the plurality of transistors are in a same layer;
the plurality of semiconductor retention layers and active layers of the plurality of transistors are in a same layer;
the at least one second light-shielding layer disposed between the active layers of the plurality of transistors and the substrate; one second light-shielding layer of the at least one second light-shielding layer is disposed between an active layer of one transistor of the plurality of transistors and the substrate, and an orthographic projection of the second light-shielding layer on the substrate covers an orthographic projection of an active portion of the active layer of the transistor on the substrate;
the at least one first light-shielding layer and the at least one second light-shielding layer being in a same layer; and
the gate insulating layer disposed between the gates of the plurality of transistors and the active layers of the plurality of transistors; wherein the at least one second light-shielding layer is disposed between the active layers of the plurality of transistors and the gate insulating layer.

2. The array substrate according to claim 1, wherein the at least one first light-shielding layer includes a plurality of first light-shielding layers; and
the plurality of first light-shielding layers are in one-to-one correspondence with the plurality of semiconductor retention layers, each first light-shielding layer is disposed between a corresponding semiconductor retention layer and the substrate, and an orthographic projection of each first light-shielding layer on the substrate covers an orthographic projection of the corresponding semiconductor retention layer on the substrate.

3. The array substrate according to claim 1, wherein the at least one second light-shielding layer includes a plurality of second light-shielding layers; and
the plurality of second light-shielding layers are in one-to-one correspondence with the plurality of transistors, each second light-shielding layer is disposed between an active layer of a corresponding transistor and the substrate, and an orthographic projection of each second light-shielding layer on the substrate covers an orthographic projection of an active portion of the active layer of the corresponding transistor on the substrate.

4. The array substrate according to claim 1, wherein the at least one second light-shielding layer includes a plurality of second light-shielding layers; and
the plurality of transistors are arranged in an array, each second light-shielding layer is disposed between active layers of a row of transistors and the substrate, and an orthographic projection of each second light-shielding layer on the substrate covers orthographic projections of active portions of active layers of the row of transistors on the substrate.

5. The array substrate according to claim 4, further comprising: a plurality of gate lines disposed above the substrate; wherein
gates of each row of transistors are electrically connected to one gate line of the plurality of gate lines; and
the orthographic projection of each second light-shielding layer on the substrate further covers orthographic projections of gates of the row of transistors on the substrate, and an orthographic projection of a gate line electrically connected to the gates of the row of transistors on the substrate.

6. The array substrate according to claim 5, wherein an arrangement manner of the plurality of gate lines includes at least one of the following:
the plurality of gate lines and gates of the plurality of transistors being in a same layer;
the plurality of gate lines and gates of the plurality of transistors being made of a same material; or
the gates of each row of transistors being a portion of a gate line corresponding to the row of transistors.

7. The array substrate according to claim 1, wherein the at least one first light-shielding layer is made of a black insulating material.

8. The array substrate according to claim 1 wherein
the at least one first light-shielding layer and the at least one second light-shielding layer being made of a same material.

9. The array substrate according to claim 1, wherein an arrangement manner of the plurality of transistors includes at least one of the following:
the first electrodes and the second electrodes of the plurality of transistors, and the plurality of data lines being made of a same material; or the active layers of the plurality of transistors and the plurality of semiconductor retention layers being made of a same material.

10. The array substrate according to claim 1, wherein the first electrode of each transistor is electrically connected to a data line;
the array substrate further comprises: a passivation layer disposed on a side of the plurality of transistors facing away from the substrate, and a plurality of pixel electrodes disposed on the passivation layer; wherein
the passivation layer includes a plurality of through holes therein, and each pixel electrode is electrically connected to a second electrode of a transistor through one through hole of the plurality of through holes.

11. A display panel, comprising:
the array substrate according to claim 1;
an opposing substrate disposed opposite to the array substrate; and
a liquid crystal layer disposed between the array substrate and the opposing substrate.

12. A display apparatus, comprising:
the display panel according to claim 11; and
a backlight assembly configured to provide light to the display panel; wherein
the backlight assembly includes: a light source and a pulse width modulation driving circuit electrically connected to the light source, and the pulse width modulation driving circuit is configured to regulate light emitted from the light source.

13. The display apparatus according to claim 12, wherein the light source includes a plurality of light-emitting diodes.

14. A method of manufacturing an array substrate, comprising:
forming a plurality of gates and a plurality of gate lines above a substrate;
forming a gate insulating layer on a side of the substrate on which the plurality of gates and the plurality of gate lines are formed;
forming a plurality of active layers, a plurality of semiconductor retention layers, a plurality of first electrodes and a plurality of second electrodes that are disposed on a side of the plurality of active layers facing away from the substrate, and a plurality of data lines disposed on a side of the plurality of semiconductor retention layers facing away from the substrate on a side of the substrate on which the gate insulating layer is formed, by one patterning process; wherein
the plurality of data lines are in one-to-one correspondence with the plurality of semiconductor retention layers, and an orthographic projection of each data line on the substrate overlaps with an orthographic projection of a corresponding semiconductor retention layer on the substrate; the plurality of gates, the plurality of active layers, the plurality of first electrodes, and the plurality of second electrodes constitute a plurality of transistors together; each active layer includes an active portion corresponding to a region between a first electrode and a second electrode of a same transistor; wherein a planar shape of each transistor is U-shaped, a first electrode includes two strip-shaped portions opposite to each other, and a connection portion on a same side of the two strip-shaped portions and connecting the two strip-shaped portions, so that a planar shape of the first electrode is substantially U-shaped, a second electrode is strip-shaped, and a portion of the second electrode extends into a region between the two strip-shaped portions of the first electrode;
before forming the plurality of semiconductor retention layers, the method of manufacturing the array substrate further comprises:
forming at least one first light-shielding layer above the substrate; wherein
one first light-shielding layer of the at least one first light-shielding layer is formed between one semiconductor retention layer of the plurality of semiconductor retention layers to be formed and the gate insulating layer, and a boundary of an orthographic projection of the first light-shielding layer on the substrate coincides with a boundary of an orthographic projection of the semiconductor retention layer on the substrate;
before forming the plurality of active layers, the method of manufacturing the array substrate further comprises:
forming at least one second light-shielding layer above the substrate; wherein
one second light-shielding layer of the at least one second light-shielding layer is formed between one active layer of the plurality of active layers to be formed and the gate insulating layer, and an orthographic projection of the second light-shielding layer on the substrate covers an orthographic projection of an active portion of the active layer on the substrate; and
the at least one first light-shielding layer and the at least one second light-shielding layer being in a same layer.

15. The method of manufacturing the array substrate according to claim 14, wherein
forming the at least one first light-shielding layer and the at least one second light-shielding layer in a same layer, and the plurality of gates and the plurality of gate lines in a same layer, by one patterning process.

16. The method of manufacturing the array substrate according to claim 14, wherein
forming the at least one first light-shielding layer and the at least one second light-shielding layer in a same layer, the plurality of active layers and the plurality of semiconductor retention layers in a same layer, and the plurality of first electrodes, the plurality of second electrodes, and the plurality of data lines in a same layer are formed, by one patterning process.

* * * * *